US010016891B2

(12) United States Patent
Reid

(10) Patent No.: US 10,016,891 B2
(45) Date of Patent: Jul. 10, 2018

(54) ROBOTIC APPARATUS AND ASSOCIATED METHOD

(71) Applicant: Core PD Limited, Glasgow (GB)

(72) Inventor: Joshua Nicholas George Reid, Glasgow (GB)

(73) Assignee: CORE PD LIMITED, Glasgow (GB)

( * ) Notice: Subject to any disclaimer, the term of this patent is extended or adjusted under 35 U.S.C. 154(b) by 119 days.

(21) Appl. No.: 14/353,928

(22) PCT Filed: Oct. 26, 2012

(86) PCT No.: PCT/GB2012/052677
§ 371 (c)(1),
(2) Date: Apr. 24, 2014

(87) PCT Pub. No.: WO2013/061084
PCT Pub. Date: May 2, 2013

(65) Prior Publication Data
US 2014/0331808 A1    Nov. 13, 2014

(30) Foreign Application Priority Data

Oct. 26, 2011 (GB) .................................. 1118529.5

(51) Int. Cl.
*B25J 9/00* (2006.01)
*B25J 9/12* (2006.01)
(Continued)

(52) U.S. Cl.
CPC ........... *B25J 9/0078* (2013.01); *B25J 9/0075* (2013.01); *B25J 9/1045* (2013.01); *B25J 9/126* (2013.01);
(Continued)

(58) Field of Classification Search
CPC ... B25J 9/0078; B25J 9/10; B25J 9/104; B25J 9/1045; B25J 9/003; B25J 9/0075;
(Continued)

(56) References Cited

U.S. PATENT DOCUMENTS 4,710,819 A * 12/1987 Brown .................... F16M 11/04
212/76
5,313,854 A * 5/1994 Akeel ................... B23Q 1/5462
212/239
(Continued)

FOREIGN PATENT DOCUMENTS

EP        2578367 A1 * 4/2013 .......... B25J 17/0266
WO    WO 9315452 A1 * 8/1993 ........... B23Q 1/5462
(Continued)

OTHER PUBLICATIONS

Search Report corresponding to British Application No. GB1118529.5 dated Feb. 23, 2012.
(Continued)

*Primary Examiner* — Willliam Kelleher
*Assistant Examiner* — Joseph H Brown
(74) *Attorney, Agent, or Firm* — Colby Nipper PLLC

(57) ABSTRACT

A robotic positioning apparatus configured for moving an element from an initial position to a target position. The apparatus includes a moveable member attachable to an element to be moved; at least one tensile support member for supporting the movable member; and at least one tensile positioning member for repositioning the moveable member. The at least one tensile positioning member is configured to maintain the at least one tensile support member in tension. The at least one tensile support member is configured to maintain an inclination of at least a portion of the moveable member during repositioning.

37 Claims, 18 Drawing Sheets

(51) Int. Cl.
  *B25J 9/10* (2006.01)
  *B25J 18/02* (2006.01)
  *B25J 17/02* (2006.01)
(52) U.S. Cl.
  CPC ......... *B25J 17/0266* (2013.01); *B25J 18/025* (2013.01); *Y10T 74/20323* (2015.01)
(58) Field of Classification Search
  CPC ...... B25J 9/00; B25J 17/0266; B25J 17/0258; B25J 17/02; Y10T 74/20323; Y10T 74/20207; B66C 21/02; B66C 21/08; B65G 47/90; B66D 1/26; B66D 3/08
  USPC ...... 74/490.01, 490.03; 212/71, 76, 83, 117, 212/121, 274; 254/278, 283, 286
  See application file for complete search history.

(56) References Cited

U.S. PATENT DOCUMENTS

| | | | | |
|---|---|---|---|---|
| 5,585,707 A * | 12/1996 | Thompson | ................ | B25J 5/00 318/568.1 |
| 6,155,758 A * | 12/2000 | Wieland | ................ | B23Q 1/015 409/201 |
| 6,343,702 B1 * | 2/2002 | Masumoto | .............. | B66C 13/06 212/274 |
| 6,566,834 B1 * | 5/2003 | Albus | .................... | B25J 9/1623 318/566 |
| 6,648,102 B2 * | 11/2003 | Bostelman | ................ | B63C 5/02 182/130 |
| 6,840,127 B2 * | 1/2005 | Moran | ................ | B23Q 1/5462 414/735 |
| 7,088,071 B2 * | 8/2006 | Rodnunsky | ............ | F16M 11/42 104/180 |
| 7,172,385 B2 * | 2/2007 | Khajepour | ........... | B25J 17/0266 414/735 |
| 7,267,240 B2 * | 9/2007 | Maurer | ................. | B66C 13/063 212/270 |
| 7,753,642 B2 * | 7/2010 | Bosscher | ............. | B25J 17/0266 414/735 |
| 2009/0066100 A1 * | 3/2009 | Bosscher | ............. | B25J 17/0266 294/86.4 |
| 2014/0331808 A1 | 11/2014 | Reid | | |

FOREIGN PATENT DOCUMENTS

| | | | | |
|---|---|---|---|---|
| WO | WO 95/23053 A1 | 8/1995 | | |
| WO | WO 2005013195 A2 * | 2/2005 | ............. | B66C 13/08 |
| WO | WO 2007/122242 A1 | 11/2007 | | |

OTHER PUBLICATIONS

Notification of Transmittal of the International Search Report and the Written Opinion of the International Searching Authority, or the Declaration corresponding to International Application No. PCT/GB2012/052677 dated Jan. 31, 2013.

* cited by examiner

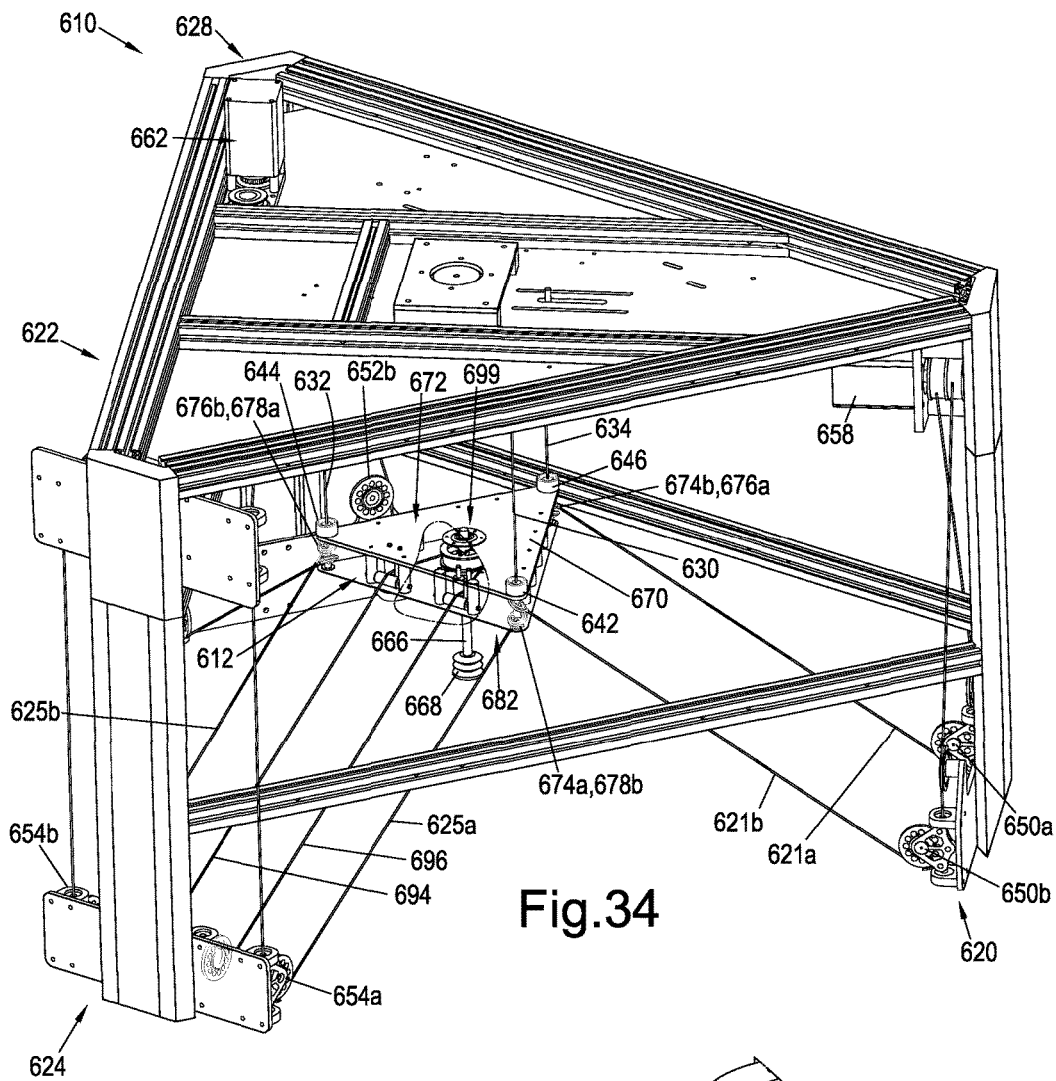
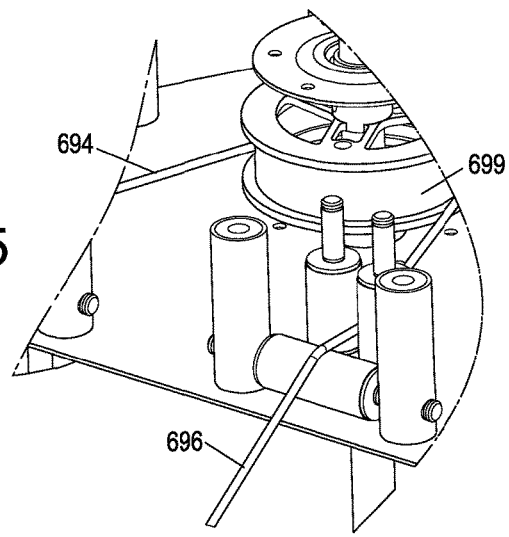
Fig. 34
Fig. 35

ROBOTIC APPARATUS AND ASSOCIATED METHOD

RELATED APPLICATIONS

This application is a 35 U.S.C. § 371 national stage application of PCT Application No. PCT/GB2012/052677, filed on Oct. 26, 2012, which claims priority from British Application No. 1118529.5, filed on Oct. 26, 2011, the contents of which are incorporated herein by reference in their entireties. The above-referenced PCT International Application was published as International Publication No. WO 2013/061084 A1 on May 2, 2013.

FIELD OF THE INVENTION

The present invention relates to a robotic apparatus and methods for use in the movement and positioning of an element; and in particular, but not exclusively to a lightweight pick and place robot such as for use in production or assembly processes.

BACKGROUND TO THE INVENTION

Robots are commonly used in the manipulation of parts, often as a replacement for the manual manipulation of parts. For example, pick and place robots are often used in production processes, such as assembly lines, to transfer parts between machines, or to position parts relative to each other (e.g. parts in holders). The robots often operate at high speeds to allow large numbers of parts to be moved and positioned quickly, in order to enable high production rates. Dependent on the nature of the parts being moved and the particular movement, robots can often achieve cycle times of a fraction of a second. Tolerances on the positioning of the parts can be tight with the robot positioning the parts accurately over a large number of cycles.

In order to achieve a high accuracy, the robots typically comprise arms with a high degree of stiffness to reduce deformations when moving at high speed. The stiff arms generally have a relatively high mass such that powerful motors are required to move the arms at the high speeds that are desired. Larger motors and stiffer arms with lower masses, such as carbon fibre arms, can help to increase speeds. However, such robots are generally complex and expensive, and are often inefficient.

SUMMARY OF THE INVENTION

According to a first aspect of the invention, there is provided a robotic positioning apparatus configured for moving an element from an initial position to a target position.

The apparatus may comprise a moveable member attachable to an element to be moved.

The apparatus may comprise at least one tensile support member for supporting the movable member.

The apparatus may comprise at least one positioning member for repositioning the moveable member. The at least one tensile positioning member may be configured to maintain the at least one tensile support member in tension.

The at least one tensile support member may be configured to maintain an inclination of at least a portion of the moveable member during repositioning.

The at least one tensile support member may comprise a plurality of connections to the moveable member, such as a plurality of anchor points on the moveable member.

The at least one tensile support member may comprise a plurality of support members.

The at least one tensile support member may comprise at least three connections to the moveable member, such as three anchor points on the moveable member.

The at least one tensile support member may comprise a plurality of tensile support members. The at least one tensile support member may comprise at least three tensile support members. Each tensile support member may comprise one of the connections to the moveable member.

The at least one tensile support member may comprise a substantially rigid portion. The at least one tensile support member may comprise a sleeve portion.

The apparatus may be configured to maintain the/each tensile support member in tension. The at least one tensile positioning member may be configured to maintain the/each tensile support member in tension. The apparatus may be configured to maintain each tensile support member in a similar tension.

Providing a robotic positioning apparatus wherein the at least one tensile positioning member maintains the at least one tensile support member in tension may permit a lightweight and/or inexpensive robotic positioning apparatus. For example, an additional support member/s, such as a compressive support member, may not be required to support the moveable member.

Providing such a robotic apparatus with a tensile support member/s and tensile positioning members may provide a robotic apparatus with lightweight moving parts. For example, using tensile support and tensile positioning members may enable the total mass of the moving parts to be reduced, relative to an apparatus comprising support and/or positioning members that are used in compression. Accordingly, the apparatus may require less force and/or energy to provide a similar movement; and/or the apparatus may be able to perform a similar movement more quickly, such as by requiring less time to accelerate to a similar speed with a similar force, with respect to a corresponding apparatus with heavier moving parts. Such an apparatus may be less complex, less expensive and/or more efficient than a corresponding apparatus with non-tensile support and/or non-tensile positioning members, such as a compressive positioning member.

Such an apparatus with tensile positioning members may allow the positioning members to have a low mass, for example a reduced mass relative to a rigid positioning member.

The at least one tensile positioning member may comprise at least two tensile positioning members.

The at least one tensile positioning member may consist of three tensile positioning members.

The at least three tensile support members may consist of three tensile support members.

The at least one/each support member may be configured to maintain tension in the/each positioning member/s.

The/each at least one tensile support member/s and/or the/each at least one tensile positioning member may be configured to apply exclusively tension to the movable member. The/each at least one tensile support member/s and/or the/each at least one tensile positioning member may be configured for non-compressive use. The/each at least one tensile support members and/or the/each at least one tensile positioning member may be configured for exclusively tensile use.

The apparatus may further comprise a support structure. The support structure may comprise a support member base. The support structure may comprise a positioning member frame.

The movable member may be suspended from the support structure. The movable member may be suspended from the support structure by the/each at least one tensile support member/s. The movable member may be suspended from the support structure by at least one of the tensile positioning members.

The/each at least one tensile support member/s may be configured to control an inclination of the movable member such as to control the inclination during movement of the movable member. The inclination may be controlled relative to the support structure. The inclination may be controlled relative to the element to be moved. The/each at least one tensile support member/s may be configured to control an inclination of the movable member with respect to a positioning plane (e.g. pitch and/or roll). The positioning plane may be substantially perpendicular to the/each at least one tensile support member. The positioning plane may be substantially perpendicular to the/each at least one tensile support member/s. The positioning plane may comprise a longitudinal positioning axis and a lateral positioning axis. The/each at least one tensile support member/s may be configured to control an inclination of the movable member about the longitudinal positioning axis. The/each at least one tensile support member/s may be configured to control an inclination of the movable member about the lateral positioning axis. The/each at least one tensile support member/s may be configured to prevent inclination of the movable member. The/each at least one tensile support member/s may be configured to maintain an inclination of the movable member, such as maintaining a substantially vertical inclination of the movable member. For example, the inclination of the movable member may be substantially fixed relative to the support member base. The/each at least one tensile support member/s may be configured to adjust an inclination of the movable member.

The/each at least one tensile support member/s may be configured to control an orientation of the movable member. The/each at least one tensile support member/s may be configured to control an orientation of the movable member with respect to the support structure. The/each at least one tensile support member/s may be configured to maintain an orientation of the movable member, such as maintaining a rotational orientation of the movable member relative to the positioning plane (e.g. yaw). The/each at least one tensile support member/s may be configured to adjust an orientation of the movable member. The/each at least one tensile support member/s may be configured to prevent orientation of the movable member with respect to the support structure.

The apparatus may comprise at least two substantially parallel tensile support members.

The apparatus may be configured to maintain the tensile support members substantially parallel at different locations of the movable member. The apparatus may be configured to maintain the tensile support members substantially parallel during movement of the movable member, such as during repositioning.

Each tensile support member may be substantially parallel with the other tensile support member/s. Each tensile support member may comprise a same effective length as the other tensile support member/s. Each tensile support member may comprise a same effective length as the other tensile support member/s at multiple/all locations of the movable member. The apparatus may be configured to maintain the same effective length of each tensile support member. The apparatus may be configured to maintain the same effective length of each tensile support member at multiple/all locations of the movable member. The effective length of each support member may be defined by a distance between the movable member and a respective support anchor.

The/each tensile positioning member may consist of a tensile positioning element.

The/each tensile positioning member may comprise a pair of tensile positioning elements.

The/each tensile positioning member may consist of a pair of tensile positioning elements.

Each tensile positioning element of the pair may be substantially parallel with the other tensile positioning element of the pair. Each tensile positioning element of the pair may remain substantially parallel with the other tensile positioning element of the pair throughout the movement of the movable member (e.g. repositioning). Each tensile positioning element of the pair may be controlled by a common positioning actuator. Each tensile positioning element of the pair may have a substantially similar effective length as the other element of the pair. Each tensile positioning element of the pair may maintain a substantially similar effective length as the other element of the pair during movement of the movable member (e.g. repositioning).

The/each tensile positioning member/s may be configured to control an orientation of the movable member. The/each tensile positioning members may define a trapezoidal linkage with the support structure and the movable member, such as a parallelogram linkage. The/each tensile positioning member/s may be configured to control an orientation of the movable member with respect to the support structure. The/each tensile positioning member/s may be configured to maintain an orientation of the movable member, such as maintaining a rotational orientation of the movable member relative to the positioning plane (e.g. yaw). The/each tensile positioning member/s may be configured to prevent rotation of the movable member, such as rotation of the movable member about a central axis, such as a central axis defined by the support member/s in the neutral position (e.g. vertical and/or perpendicular to the positioning plane). The/each tensile positioning member/s may be configured to adjust an orientation of the movable member.

The robotic positioning apparatus may be a high-speed robotic positioning apparatus, such as for use in a production and/or an assembly process (e.g. a pick and place robot).

The/each at least one tensile support member/s and/or the/each at least two tensile positioning member/s may comprise an adjustable effective length.

The movable member may be movable by adjusting the relative effective lengths of the tensile positioning members and/or the at least one tensile support member/s.

Providing such a robotic apparatus for the movement and positioning of an element wherein adjusting the relative effective lengths of the tensile members moves the movable member may permit the apparatus to have a low cycle time for moving the element.

The/each at least one tensile support member/s and/or the/each at least two tensile positioning member/s may comprise a low mass, such as a lower mass than a compressive member, such as an equivalent compressive member (e.g. a rigid member for applying a corresponding force in an alternative robotic apparatus).

The/each at least one tensile support member/s and/or the/each at least one tensile positioning member may comprise a flexible tensile element, such as a wire and/or a cable and/or a rope and/or a string and/or a strand and/or a tape and/or a band.

The/each at least one tensile support member/s and/or the/each at least one tensile positioning member may be substantially inelastic.

The/each at least one tensile support member/s and/or the/each at least one tensile positioning member may comprise a substantially elastic portion/s.

The flexible tensile element/s may be of lower mass than a corresponding rigid or stiff member (such as a corresponding rigid or stiff member for conveying a similar tensile force/s).

The/each at least one tensile support member/s may be configured to exert a first net tensile force on the movable member in a first direction. The at least one tensile positioning member may be configured to exert a second net tensile force on the movable member in a second direction.

The first net tensile force may be a resultant force of resolving each tensile force of each tensile support member.

The second net tensile force may be a resultant force of resolving each tensile force of each tensile positioning member.

The apparatus may be configured to balance the first and the second net tensile forces, such as to maintain a position of the movable member.

The apparatus may be configured to adapt the first and the second net tensile forces, such as to vary a position of the movable member (e.g. to vary a height).

The apparatus may be configured to maintain a position of the movable member when the first and second net tensile forces are balanced.

The first and second directions may be substantially opposite.

The first and second directions may be substantially opposite in a first configuration.

The first and second directions may be substantially vertical. For example, the first direction may be substantially upwards and the second direction may be substantially downwards.

The first and second directions may be substantially non-vertical, such as diagonal or substantially horizontal.

The first direction may be substantially away from the element to be moved. The second direction may be substantially towards the element to be moved.

Prior to attachment of the movable member to the element to be moved, the first net tensile force may be substantially away from the initial position, and the second net tensile force may be substantially towards the initial position.

The support member base may provide anchor points for each tensile support member. A distance between each support member anchor point and the movable member may determine each effective length of the respective support member.

The movable member may be located between the support member base and the element to be moved.

The positioning member frame may provide anchor points for each tensile positioning member. Each positioning member may pull the movable member towards respective anchor points. A distance between each positioning member anchor point and the movable member may determine the effective length of each respective positioning member. For example, the movable member may be moved towards a first tensile positioning member anchor point by shortening the effective length of the first tensile positioning member relative to the other tensile positioning member/s.

Each tensile positioning member may be configured to pull the movable member away from the support member base.

The tensile positioning members may be distributed around the movable member, such as evenly distributed.

Each tensile positioning member may comprise a substantially radial tensile force component. The/each radial tensile component may pull the movable member away from a central axis, the central axis defined between the movable member in a central position and the support member base. Each tensile positioning member may be configured to pull the movable member in a different substantially radial direction from the other tensile positioning members. Each tensile positioning member may comprise a substantially axial tensile force component, the substantially axial tensile force component pulling the movable member away from the support member base.

The apparatus may be configured to control a separation of the movable member from the support member base by controlling a relative pull on the movable member by the respective support members and positioning members.

The apparatus may be configured to maintain the separation of the movable member from the support member base by balancing a pull of the positioning members on the movable member away from the support member base with a pull of the support members on the movable member towards the support member base.

The apparatus may be configured to vary a separation between the movable member and the support member base. The apparatus may be configured to vary the separation of the movable member from the support member base by varying the collective pull of the positioning members on the movable member away from the support member base relative to the collective pull of the support members on the movable member towards the support member base.

The apparatus may be configured to vary the separation between the movable member and the support member base by varying a total net tensile force, the total net tensile force being a difference between the first and the second net tensile forces. For example, the apparatus may be configured to reduce the separation by reducing the first net tensile force with respect to the second net tensile force.

The at least one/each support member/s may comprise a pre-tension. The at least two/each positioning member may comprise a pre-tension. The/each pre-tension may be adjustable. The/each pre-tension may be predetermined.

The separation may be a height.

The separation may provide an offset between the movable member and the element to be moved, such as an offset to the initial position. The offset may be a height.

The apparatus may be configured to synchronously adjust the relative lengths of the positioning members. The apparatus may be configured to adjust the relative lengths of the positioning members whilst maintaining tension in each of the support members. The apparatus may be configured to adjust the relative lengths of the positioning members whilst maintaining similar tensions in the/each of the support member/s. The apparatus may be configured to adjust the relative lengths of the positioning members whilst maintaining tension in each of the positioning members. The apparatus may be configured to adjust the relative lengths of the positioning members whilst maintaining pretension in each of the positioning members. The apparatus may be configured to adjust the relative lengths of the positioning members whilst maintaining similar tensions in each of the positioning members. The apparatus may be configured to adjust the relative lengths of the positioning members whilst compensating for an inertia (e.g. for a tension in a support member caused by an inertia of the movement of the movable member and/or of an element being moved and/or of a tensile member/s being moved).

The apparatus may be configured to synchronously adjust the relative lengths of the support members. The apparatus may be configured to adjust the relative lengths of the support members whilst maintaining tension in each of the support members. The apparatus may be configured to adjust the relative lengths of the support members whilst maintaining similar tensions in each of the positioning members. The apparatus may be configured to adjust the relative lengths of the support members whilst maintaining tension in each of the positioning members. The apparatus may be configured to adjust the relative lengths of the support members whilst maintaining pretension in each of the support members. The apparatus may be configured to adjust the relative lengths of the support members whilst maintaining similar tensions in each of the positioning members. The apparatus may be configured to adjust the relative lengths of the support members whilst compensating for an inertia effect/s (e.g. for a tension in a positioning member caused by an inertia of the movement of the movable member and/or of an element being moved and/or of a tensile member/s being moved).

The apparatus may be configured to adjust a relative length of a tensile positioning members and/or a support member whilst maintaining an inclination of the movable member.

Each support member may be connected to the movable member via a respective support pulley. Each support pulley may define the respective anchor for each tensile support member.

The apparatus may be configured to control the position and/or movement of the movable member using position-dependent control and/or displacement-dependent control and/or force-dependent control.

Tension in the/each tensile positioning and/or support member/s may be displacement-controlled and/or tension-controlled.

The apparatus may further comprise a support actuator. The/each support member may be connected to the/a support actuator.

The support actuator may be mounted or housed in the support structure. The support actuator may be arranged so as to remain substantially stationary in use. The movable member may be substantially free from support and/or positioning actuators.

Each support member may be connected to a same common support actuator.

The support member base may comprise the/each support pulley and/or the/each support actuator.

The/each support actuator may be configured to maintain and/or vary the tension in the/each support member/s using displacement control and/or tension control. For example, the support actuator may comprise a tension sensor and/or a displacement sensor.

Each positioning member may be connected to the movable member via a respective positioning pulley. Each positioning pulley may define the respective anchor for each tensile positioning member.

The apparatus may further comprise a positioning actuator. The length of the/each positioning member/s may be controlled by a positioning actuator. For example, each positioning member may be connected to a respective positioning actuator.

The/each positioning actuator/s may be configured to maintain and/or vary the tension in the/each positioning member/s using displacement control and/or tension control. For example, the support actuator may comprise a tension sensor and/or a displacement sensor.

The positioning frame may comprise the/each positioning pulley and/or the/each positioning actuator.

The apparatus may comprise a control system for controlling the movement of the movable member. The control system may send a respective signal to the/each actuator to adjust the respective effective length of each positioning member and/or each support member.

A position of the/each actuator may be fixed relative to the support structure.

The/each actuator may comprise a winch.

At least one actuator may be connected to another actuator. Multiple actuators may be connected to each other. The actuators may be mechanically connected. The actuators may be synchronised. The actuators may be (mechanically) independent from each other. Control of the actuators may be synchronised. For example, the actuators may be connected to each other via a control line/s. The control line/s may be electric. The control line/s may be hydraulic. The control line/s may be pneumatic.

Multiple tensile members may be connected to a common actuator. For example, all of the support members may be connected to a single (e.g. central) actuator. A single support actuator may be provided for maintaining the inclination of the movable member. The apparatus may be configured such that an orientation of each of the support members is substantially parallel at connection of each support member to the common actuator. The actuator/s may be configured to maintain a substantially equal effective length of each support member. The actuator/s may be configured to maintain a substantially equal effective tension in each support member.

Providing a common actuator may reduce complexity and/or increase speed and/or reduce cost and/or increase efficiency and/or simplify control.

Both of the tensile support elements of the/each positioning member may be connected to the same (common) positioning actuator. The apparatus may comprise single common positioning actuators for each respective pair of tensile support elements.

The apparatus may be configured to attach to and/or detach from the element to be moved.

The apparatus may be configured to attach to and/or detach from the element to be moved outwith a volume substantially circumscribed by the anchor point/s of the tensile support member/s and/the positioning members. The apparatus may be configured to attach to and/or detach from the element to be moved outwith a volume substantially circumscribed by the support structure.

The moveable member may comprise a moveable member chassis. The chassis may comprise the portion of the moveable member of maintained inclination during repositioning.

The moveable member may comprise an attachment interface for attaching the movable member to an element to be moved.

The movable member may comprise an attachment separation between the movable member chassis and the attachment interface. The attachment separation may be defined by an intermediate member, such as a substantially rigid rod or the like.

The attachment separation may be configured to maintain a distal relationship between the element to be moved and the/each positioning member/s.

The attachment interface may be fixed relative to the movable member chassis. The separation of the attachment interface from the movable member chassis may be fixed. An inclination of the attachment interface relative to the movable member chassis may be fixed. An orientation of the attachment interface relative to the movable member chassis may be fixed.

The attachment interface may be adjustable relative to the movable member chassis. The separation of the attachment interface from the movable member pivot may be adjustable. The inclination of the attachment interface relative to the movable member may be adjustable. The orientation of the attachment interface relative to the movable member may be adjustable. The attachment interface may be connected to the movable member via an attachment interface pivot. The attachment interface pivot may be a universal joint, such as a ball joint.

The attachment interface may be operable independently of the movable member.

Operation of the attachment interface may be linked to the movement of the movable member. For example, the attachment interface may be configured to engage whenever the movable member is moved to a predetermined position, such as the initial position.

The attachment interface may comprise a tool for engaging an element to be moved. The attachment interface may comprise a gripper. The attachment interface may comprise a suction element.

The apparatus may comprise an attachment interface orientation means.

The attachment interface orientation means may comprise an attachment interface orientation member.

At least one of the positioning members may comprise the attachment interface orientation means. For example, where the at least one positioning member comprises a pair of tensile positioning elements, the tensile positioning elements may define the attachment interface orientation member. The pair of tensile positioning elements may form a tensile loop, such that a change in a relative tension and/or effective length of one of the tensile positioning elements of the pair with respect to the other tensile positioning element of the pair results in an exertion of an orientating force on the attachment interface (e.g. the attachment interface is rotated when there is a difference between each of the tensile support elements of a tensile support member).

The apparatus may be configured to monitor tension in the/each positioning member and/or the/each support member/s. For example, the/each actuator may comprise a torque sensor. The apparatus may be configured to monitor the/each length of the positioning member and/or the support member/s.

The apparatus may be configured to be calibrated. For example, the apparatus may be configured to define a neutral position of the movable member, such as a central position (e.g. proximal and/or adjacent or above the initial position).

The apparatus may comprise the element to be moved. For example, the element to be moved may be a tool, such as a paint applicator.

The apparatus may further comprise a central connection member connecting the movable member to the support structure, such as connecting at the support member base.

The central connection member may be pivotally connected to the support member base at a connection member first portion. The central connection member may be pivotally connected to the movable member at a connection member second portion. The central connection member may comprise a compressive member. The central connection member may comprise a stiff member. The central connection member may comprise a rigid member, such as a rod.

The provision of at least three tensile positioning members each configured to pull the central connection member in a different substantially radial direction from the other tensile positioning members may permit the central connection member to be pulled in any substantially radial direction.

At least one/each of the support members may be configured to exert an axially compressive force on the connection member. For example, at least one/each of the support members may be configured to pull the connection member axially towards the support member base. At least one/each of the support members may be configured to pull the connection member axially away from the moveable member.

At least one/each of the positioning members may be configured to exert an axially tensile force on the connection member. For example, at least one/each of the positioning members may be configured to pull the connection member axially away from the support member base. At least one/each of the positioning members may be configured to pull the connection member axially towards the movable member. The connection member may comprise at least three degrees of freedom with respect to the support member base (e.g. pivotable in x direction, pivotable in y direction and rotatable about z axis). The connection member may comprise at least four degrees of freedom with respect to the support member base (e.g. axially extendable in z direction) The connection member may be connected to the support member base by a support member base pivot. The support member base pivot may comprise a support member base universal pivot (e.g. a ball joint). The connection member may comprise one degree of freedom with respect to the support member base (e.g. pivotable in x direction). The support member base pivot may comprise a support member base hinge.

The connection member may comprise at least three degrees of freedom with respect to the movable member (e.g. pivotable in x direction, pivotable in y direction and rotatable about z axis). The connection member may be connected to the movable member by a movable member universal pivot (e.g. a ball joint). The connection member may comprise one degree of freedom with respect to the movable member (e.g. pivotable in x direction). The connection member may be connected to the movable member by a movable member hinge.

The connection member may be extensible, such as axially extensible. The connection member may be configured to vary a separation between the movable member and the support member base pivot.

The connection member may be telescopic. The connection member may comprise at least one surface for adjusting the length of the connection member, the surface substantially non-perpendicular to the longitudinal axis of the connection member. The surface may comprise a spline and/or a helix and/or a screwthread. The connection member may comprise at least two longitudinal elements. The surface may define at least a portion of an interface between the two longitudinal elements.

The connection member may be configured to selectively comprise a fixed length. For example, a length of the connection member may be effectively locked. The connection member may comprise a length lock. Selectively fixing the length of the connection member may assist in maintaining the support member/s in tension and/or maintaining an inclination and/or orientation and/or relative height of the movable member.

The connection member may comprise a fixed length. The connection member may be non-extensible. The connection member may be configured to maintain the movable member at a substantially fixed distance from the support member base pivot.

The inclination of the movable member may be variable with respect to a central axis of the connection member. The inclination of the movable member may be variable with respect to a central axis of the connection member according to a pivoting of the connection member with respect to the support member base. The support member may be configured to exert a tensile force on the movable member substantially parallel to the connection member central axis. The support member may be configured to exert a tensile force on the movable member substantially parallel to the connection member central axis during movement of the connection member.

The apparatus may be configured to control an orientation of the movable member. The apparatus may be configured to control an orientation of the movable member relative to the connection member central axis. The orientation may be fixed.

The/each positioning member/s may be connected to the connection member via a pulley. The pulley may be configured to pivot. For example, the pulley may be configured to flag such that the pulley is always substantially aligned with a positioning member anchor point on the movable member. The pulley may be configured to pivot such that a rotation axis of the pulley is always substantially perpendicular to the connection member central axis.

The target position may be distinct from the initial position.

The target position may comprise the initial position. For example, the apparatus may be configured to attach to an element to be moved at an initial position, the element to be moved initially being associated with a second element (e.g. a support/holder). The apparatus may be configured to detach from the element to be moved at the target position, wherein the target position is substantially the same as the initial position (e.g. with the second element replaced/removed).

According to a second aspect of the invention, there is provided a method of robotically moving an element, the method comprising:

supporting a movable member with at least one tensile support member;

moving the movable member with at least one tensile positioning member;

maintaining the at least one tensile support member in tension with the at least one tensile positioning member; and maintaining an inclination of the moveable member during movement of the moveable member.

The method may further comprise: attaching the movable member to an element to be moved.

The at least one tensile support member may comprise three tensile support members.

The method may further comprise maintaining an inclination of the movable member relative to a support member base.

The method may further comprise maintaining an orientation of the movable member relative to the support member base.

The movable member may be pivotally connected to a central connection member at a connection member second portion.

The method may further comprise:

adjusting the relative lengths of at least three tensile positioning members, each tensile positioning member connected to the moveable member, and each tensile positioning member configured to pull the moveable member in a different substantially radial direction from the other tensile positioning members.

Adjusting the relative lengths of the at least three tensile positioning members may cause the connection member to pivot relative to the support member base, the support member base pivotally connected to the connection member at a connection member second portion, such that the movable member moves.

According to a third aspect of the present invention there is provided a robotic apparatus for the movement and positioning of an element, the apparatus comprising:

a movable member attachable to an element to be moved;

a support member base;

a connection member connecting the movable member to the support member base, the connection member pivotally connected to the support member base at a connection member first portion and connected to the movable member at a connection member second portion;

an adjustable tensile positioning member, the tensile positioning member connected to the connection member, and the tensile positioning member configured to pull the connection member in a substantially radial direction;

wherein adjusting the effective length of the tensile positioning member moves the movable member.

The connection member may be a central connection member.

The connection member may be pivotally connected to the movable member at the connection member second portion.

The apparatus may comprise at least two adjustable tensile positioning members.

The apparatus may comprise at least three adjustable tensile positioning members.

Adjusting the relative lengths of the tensile positioning members may move the movable member.

According to a fourth aspect of the invention, there is provided a method of robotically moving an element, the method comprising:

supporting a movable member with at least three tensile support members;

moving the movable member with at least one tensile positioning member;

maintaining the at least one tensile support member in tension with the at least one tensile positioning member; and maintaining an inclination of the moveable member during movement of the moveable member.

The method may further comprise: attaching the movable member to an element to be moved. The movable member may be pivotally connected to a central connection member at a connection member second portion.

The at least one tensile support member may comprise three tensile support members.

The method may further comprise:

adjusting the relative lengths of at least three tensile positioning members, each tensile positioning member connected to the central connection member, and each tensile positioning member configured to pull the central connection member in a different substantially radial direction from the other tensile positioning members moves the movable member;

wherein adjusting the relative lengths of the at least three tensile positioning members causes the connection member to pivot relative to a support member base, the support member base pivotally connected to the connection member at a connection member second portion, such that the movable member moves.

The method may further comprise maintaining an inclination of the movable member relative to the support member base.

The method may further comprise maintaining an orientation of the movable member relative to the support member base.

The invention includes one or more corresponding aspects, embodiments or features in isolation or in various combinations whether or not specifically stated (including claimed) in that combination or in isolation. For example, it will readily be appreciated that features recited as optional with respect to one aspect may be additionally applicable with respect to any other aspect, without the need to explicitly and unnecessarily list those various combinations and permutations here. For example, features of the robotic apparatus of the first aspect may be combined with the robotic apparatus of the third aspect.

It will be appreciated that one or more embodiments/aspects may be useful in moving and positioning an element, such as a component during a production process. Corresponding means for performing one or more of the discussed functions are also within the present disclosure.

BRIEF DESCRIPTION OF THE DRAWINGS

These and other aspects of the present invention will now be described, by way of example only, with reference to the accompanying drawings, in which:

FIG. 34 shows a bottom perspective view of the apparatus of FIG. 25; and

FIG. 35 shows a detail view of a partial cutaway portion of the movable member of the apparatus of FIG. 34.

DETAILED DESCRIPTION OF THE DRAWINGS

Figure 1:
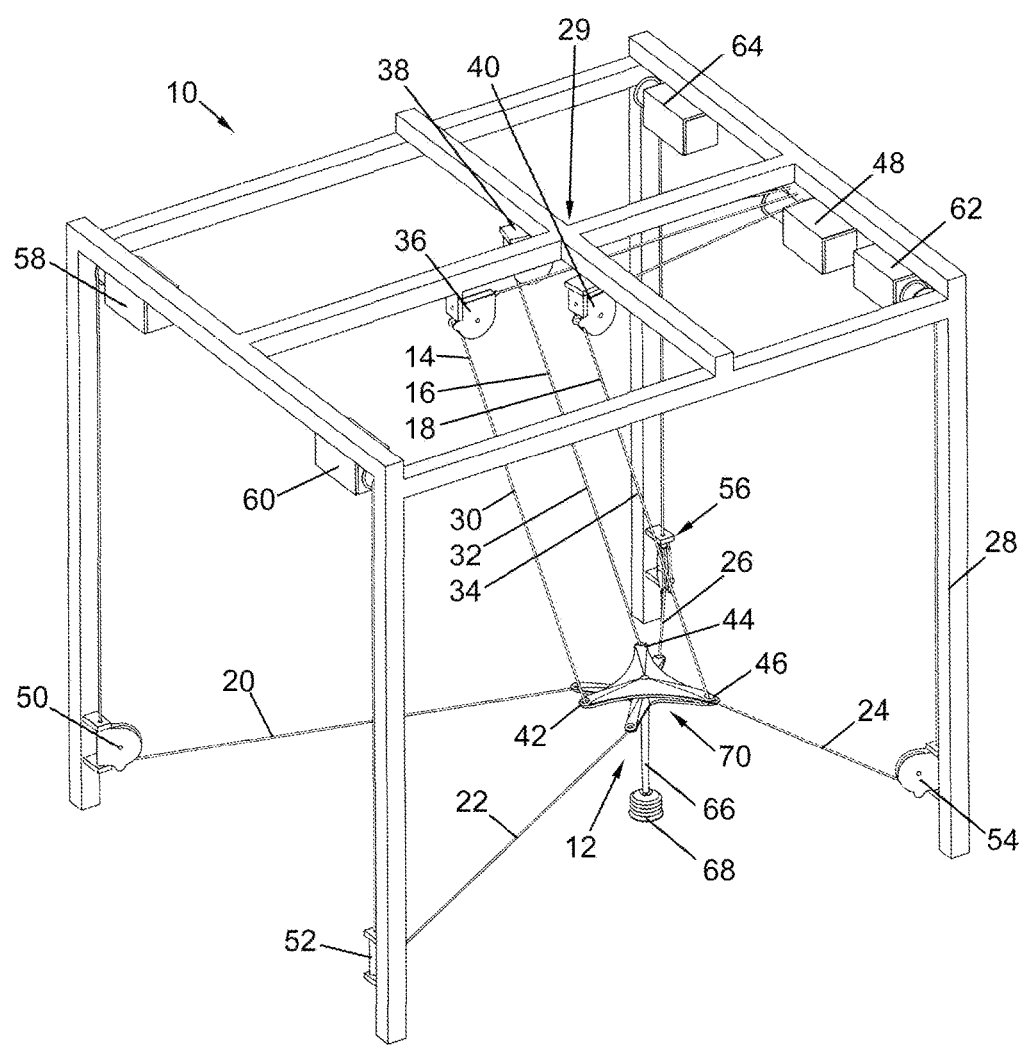
FIG. 1 is a schematic representation of a robotic positioning apparatus for the movement of an element in accordance with an embodiment of the invention.

Reference is first made to FIG. 1 in which there is shown a robotic apparatus 10 in accordance with an embodiment of the present invention for use in moving of an element (not shown). The apparatus 10 comprises a movable member 12; three tensile support members 14, 16, 18 for supporting the movable member 12; and four tensile positioning members 20, 22, 24, 26 for positioning the moveable member 12. The support members 14, 16, 18 respectively connect the moveable member to a frame 28.

The support members 14, 16, 18 are connected to the frame 28 at a support member base 29. The tensile positioning members 20, 22, 24, 26 are connected to the frame 28 such that they each maintain the tensile support members 14, 16, 18 in tension. In the embodiment shown in FIG. 1, each tensile positioning member 20, 22, 24, 26 is connected to the frame 28 at a position opposite the support member base 29. That is, the tensile positioning members 20, 22, 24, 26 each exert a downwards component of force on the moveable member 12, whilst each of the support members 14, 16, 18 exerts an upwards component of force on the moveable member 12. (It will be appreciated that in other embodiments, the apparatus 10 may have other orientations). Accordingly, the tensile positioning members 20, 22, 24, 26 ensure that the support members 14, 16, 18 are maintained in tension.

The support members 14, 16, 18 are all substantially the same length as each other. That is the effective length 30, 32, 34 of each support member 14, 16, 18 between the frame 28 and the moveable member 12 remains substantially the same as each other 30, 32, 34 during movement of the moveable member 12. In the embodiment shown, the support members 14, 16, 18 are all parallel with each other. Accordingly, the inclination of the moveable member 12 relative to the frame 28 remains constant whenever the support members 14, 16, 18 are maintained in tension, at the same length. In the embodiment shown, the moveable member 12 remains substantially horizontal during and throughout movement of the moveable member 12.

The support members 14, 16, 18 are connected to the frame 28 via respective support pulleys 36, 38, 40. The support pulleys 36, 38, 40 define respective frame support anchor points for the support members 14, 16, 18 on the frame 28. The frame support anchor points correspond to respective anchor points 42, 44, 46 of the support members 14, 16, 18 on the moveable member 12. In the embodiment shown, the arrangement of the frame support anchor points and the moveable member support anchor points 42, 44, 46 are similar such that the support members 14, 16, 18 are substantially parallel with each other and remain substantially parallel during movement of the moveable member 12.

The support members 14, 16, 18 are connected to a common support actuator 48. The common support actuator 48 provides a common (pre)tension to each support member 14, 16, 18. The common support actuator 48 ensures that the effective length 30, 32, 34 of each support member 14, 16, 18 remains the same. The actuator 48 is configured to adjust the effective lengths 30, 32, 34 of each support member 14, 16, 18 simultaneously. For example, increasing a tension applied by the common support actuator 48 effectively decreases the lengths 30, 32, 34 of each support member. As the lengths 30, 32, 34 of each support member are decreased similarly and simultaneously, the moveable member 12 is pulled and moved towards the support member base 29 whilst maintaining the inclination of the moveable member 12 relative to the frame 28. Providing a single common support actuator 48 for the plurality of support members 14, 16, 18 reduces the complexity of the apparatus.

The positioning members 20, 22, 24, 26 are connected to the frame 28 via respective positioning pulleys 50, 52, 54, 56. The respective positioning pulleys 50, 52, 54, 56 effectively define the anchor points for the positioning members 20, 22, 24, 26 on the frame 28. Each positioning member 20, 22, 24, 26 is connected to a respective positioning actuator 58, 60, 62, 64. Each positioning actuator 58, 60, 62, 64 is independently actuable such that each positioning actuator 58, 60, 62, 64 may exert an independent tensile force on each respective positioning member 20, 22, 24, 26.

The positioning members 20, 22, 24, 26 are distributed around the moveable member 12 such that the moveable member is pulled in multiple directions. Accordingly, the orientation of the moveable member 12 can be maintained by the positioning members 20, 22, 24, 26 when a resultant force of their respective tensions is balanced.

In the embodiment shown, the pulleys 36, 38, 40, 50, 52, 54, 56 are configured to flag. That is, the pivot axis of each respective pulley 36, 38, 40, 50, 52, 54, 56 is rotatable. Accordingly the pulleys 36, 38, 40, 50, 52, 54, 56 can rotate such that the pulley axis remains perpendicular to the effective lengths of the tensile members 14, 16, 18, 20, 22, 24, 26 irrespective of relative lateral movement of the moveable member 12 or tensile member 14, 16, 18, 20, 22, 24, 26.

Each of the actuators 48, 58, 60, 62, 64 is connected to a control system (not shown) that coordinates actuation of the actuators 48, 58, 60, 62, 64 such that the moveable member 12 can be freely moved in any direction whilst maintaining tension in each tensile member 14, 16, 18, 20, 22, 24, 26 and maintaining the inclination of the moveable member 12. Any path of movement is thereby achievable, such as linear in any direction including up, down, sideways, diagonally or any direction therebetween; and/or circuitous or curved.

Maintaining tension in each tensile member 14, 16, 18, 20, 22, 24, 26 throughout movement ensures that the inclination and orientation of the moveable member 12 is maintained. Maintaining the inclination and/or orientation of the moveable member 12 is useful in defining a controlled moving reference for the accurate positioning and/or repositioning of the element to be moved, such as to a target position.

The moveable member 12 further comprises a stalk 66 connecting a gripper 68 to a moveable member chassis 70. The moveable member chassis 70 comprises the support member anchor points 42, 44, 46. The stalk 66 ensures a separation between the gripper 68 and the chassis 70 such that the positioning members 20, 22, 24, 26 are separated from the gripper 68 and the element to be moved, such that the element to be moved can be located in a volume free from tensile members, thus reducing risk of collision and/or entanglement. The stalk 66 can enable the gripper 68 to be positioned below the positioning pulleys 50, 52, 54, 56.

Figure 2:
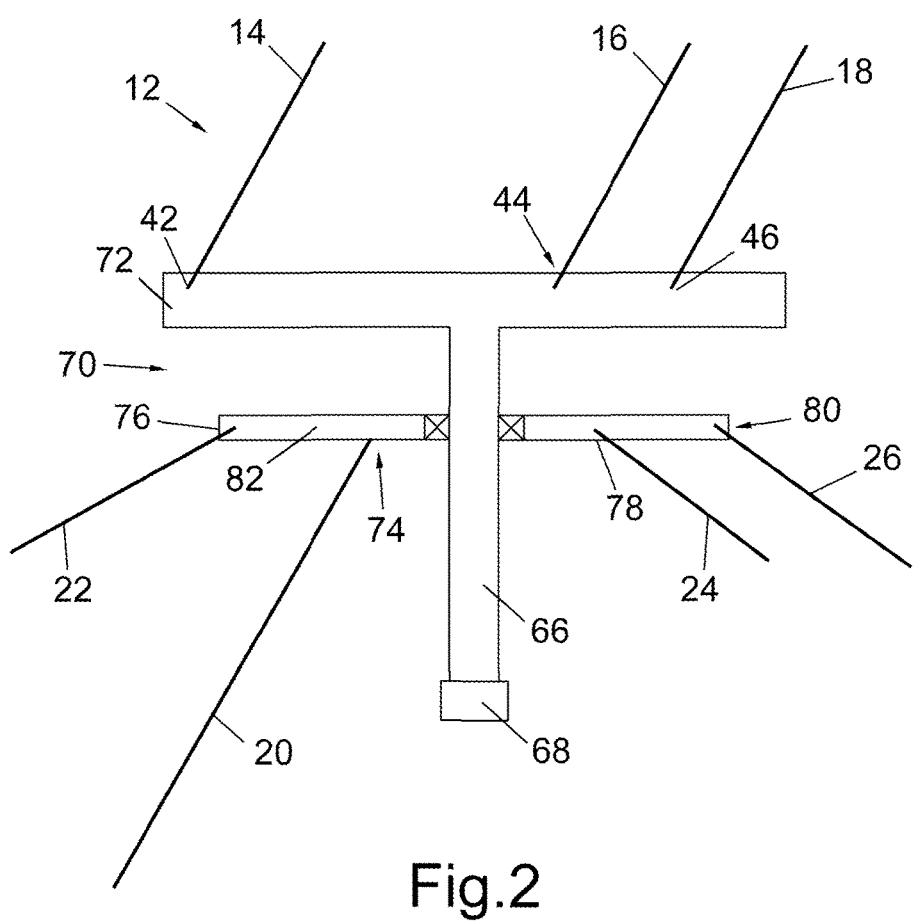
FIG. 2 is a schematic representation of a movable member of the apparatus of FIG. 1.

FIG. 2 is a schematic representation of a side view of the movable member 12 of the apparatus 10 of FIG. 1. FIG. 2 shows the anchor points 42, 44, 46 of the support members 14, 16, 18 on an upper portion 72 of the chassis 70; and the anchor points 74, 76, 78, 80 of the positioning members 20, 22, 24, 26 on a lower portion 82 of the chassis 70. Accordingly, the support members 14, 16, 18 and positioning members 20, 22, 24, 26 are separated; thus reducing risk of entanglement. The separation of the gripper 68 from the positioning members 20, 22, 24, 26 is also clearly shown.

Figure 3:
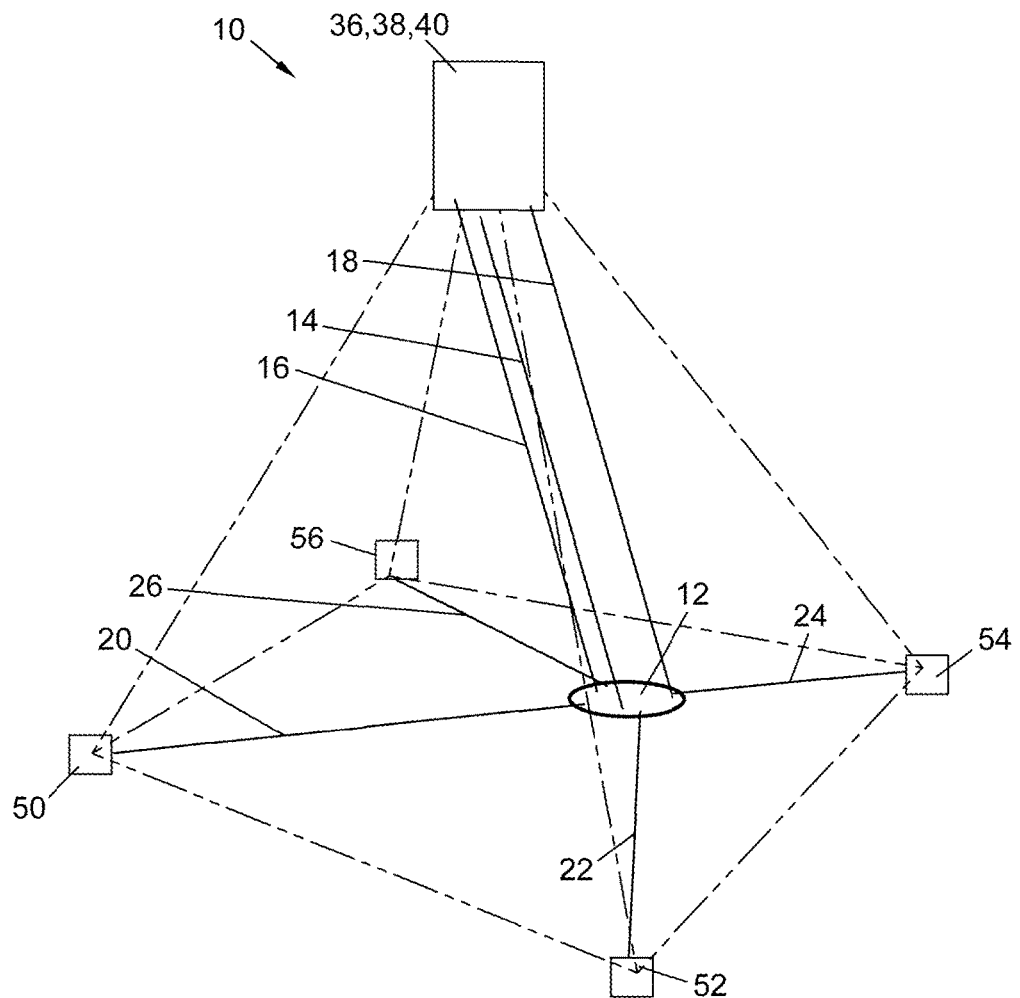
FIG. 3 is a schematic representation of the robotic apparatus of FIG. 1.

FIG. 3 is a schematic perspective view of the apparatus 10 of FIG. 1, with the frame 28 removed. The arrangement of the tensile members 14, 16, 18, 20, 22, 24, 26 is shown in a substantially conical volume with the support members 14, 16, 18 anchored at an approximate apex of the conical volume. The positioning member anchor points 50, 52, 54, 56 are shown connected to each other and the apex with dashed lines indicative of a pyramidal variant of the conical volume. The conical volume defines an effective working volume of the support and positioning members 14, 16, 18, 20, 22, 24, 26.

Figure 4:
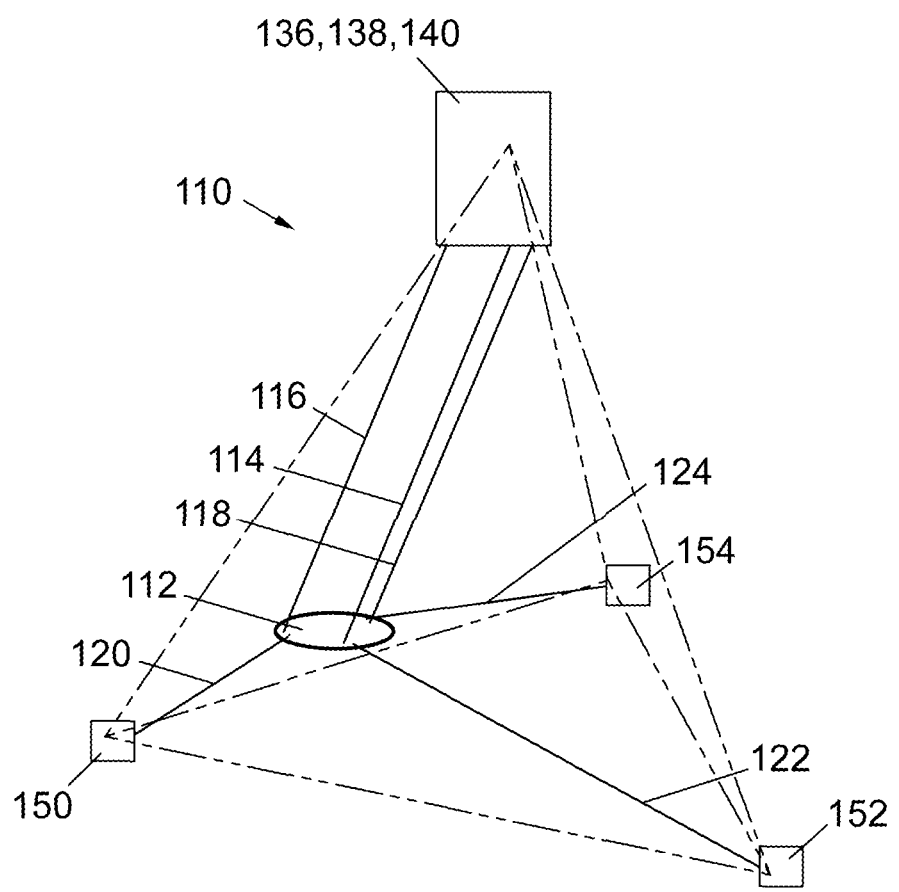
FIG. 4 is a schematic representation of a robotic apparatus for the movement and positioning of an element in accordance with an embodiment of the invention.

FIG. 4 is a schematic perspective view of another embodiment of an apparatus 110 of the present invention with a frame removed. The apparatus shown in FIG. 4 is generally similar to that shown in FIG. 3, and as such like features share like reference numerals, incremented by 100. The apparatus 110 shown comprises three positioning members 120, 122, 124; each connected to the frame (not shown) via respective positioning pulleys 150, 152, 154. The respective positioning pulleys 150, 152, 154 effectively define the anchor points for the positioning members 120, 122, 124 on the frame. It will be appreciated that the apparatus 110 of FIG. 4 is capable of moving the movable member 112 in any direction substantially perpendicular to the support members 114, 116, 118 in their central position; or moving the movable member along any path in defines an effective (conical) (tetrahedral) working volume of the support and positioning members 114, 116, 118, 120, 122, 124, as shown by dashed lines.

Figure 5:
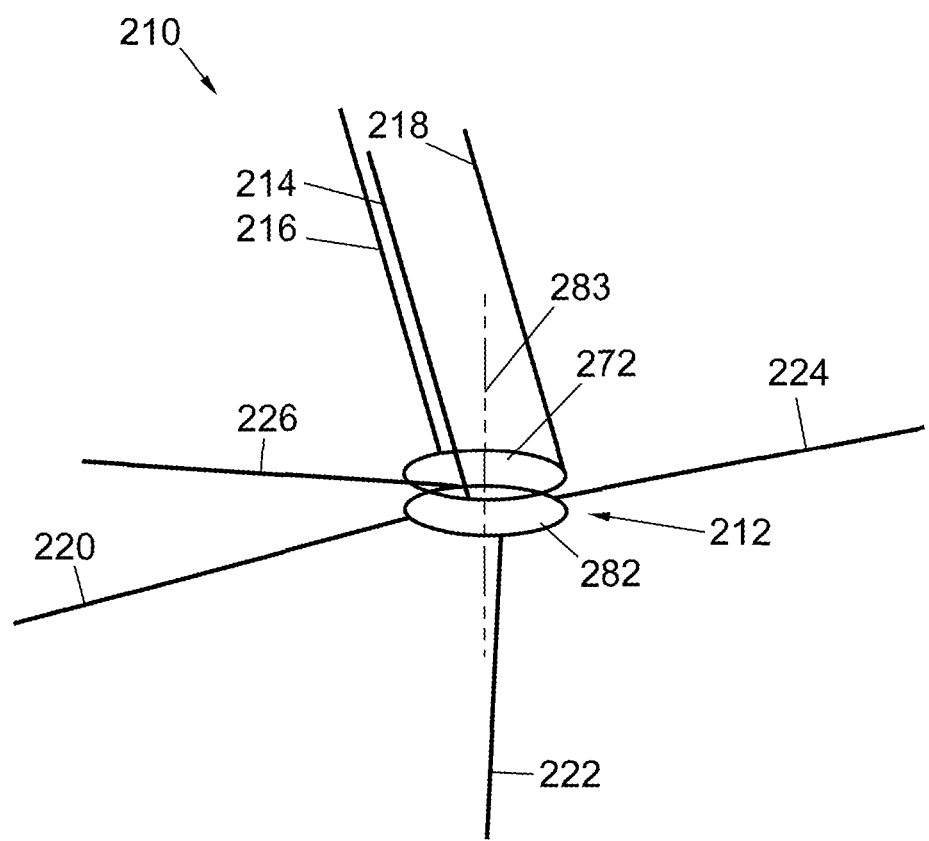
FIG. 5 is a schematic side view of a portion of a robotic apparatus for the movement and positioning of an element in accordance with an embodiment of the invention.

FIG. 5 is a schematic side view of a robotic apparatus according to the invention. The apparatus shown in FIG. 5 is generally similar to that shown in FIG. 4, and as such like features share like reference numerals, incremented by 100. FIG. 5 schematically illustrates anchor points 242, 244, 246, 248 of support members 214, 216, 218 on an upper portion 272 of a chassis 270; and anchor points 274, 276, 278, 280 of positioning members 220, 222, 224, 226 on a lower portion 282 of the chassis 270. In the embodiment shown, the lower portion 282 is rotatable with respect to the upper portion 272, such that it will readily be appreciated that the orientation of the lower portion 282 may be adjusted by controlling the positioning members respective relative tensile forces on the lower portion 282. Accordingly, an attachment interface (not shown) and the element to be moved (not shown) may be rotated independently of the movable member chassis upper portion 272. FIG. 5 further illustrates an axis 283 of the movable member 212 that remains substantially vertical throughout movement of the movable member 212.

Figure 6:
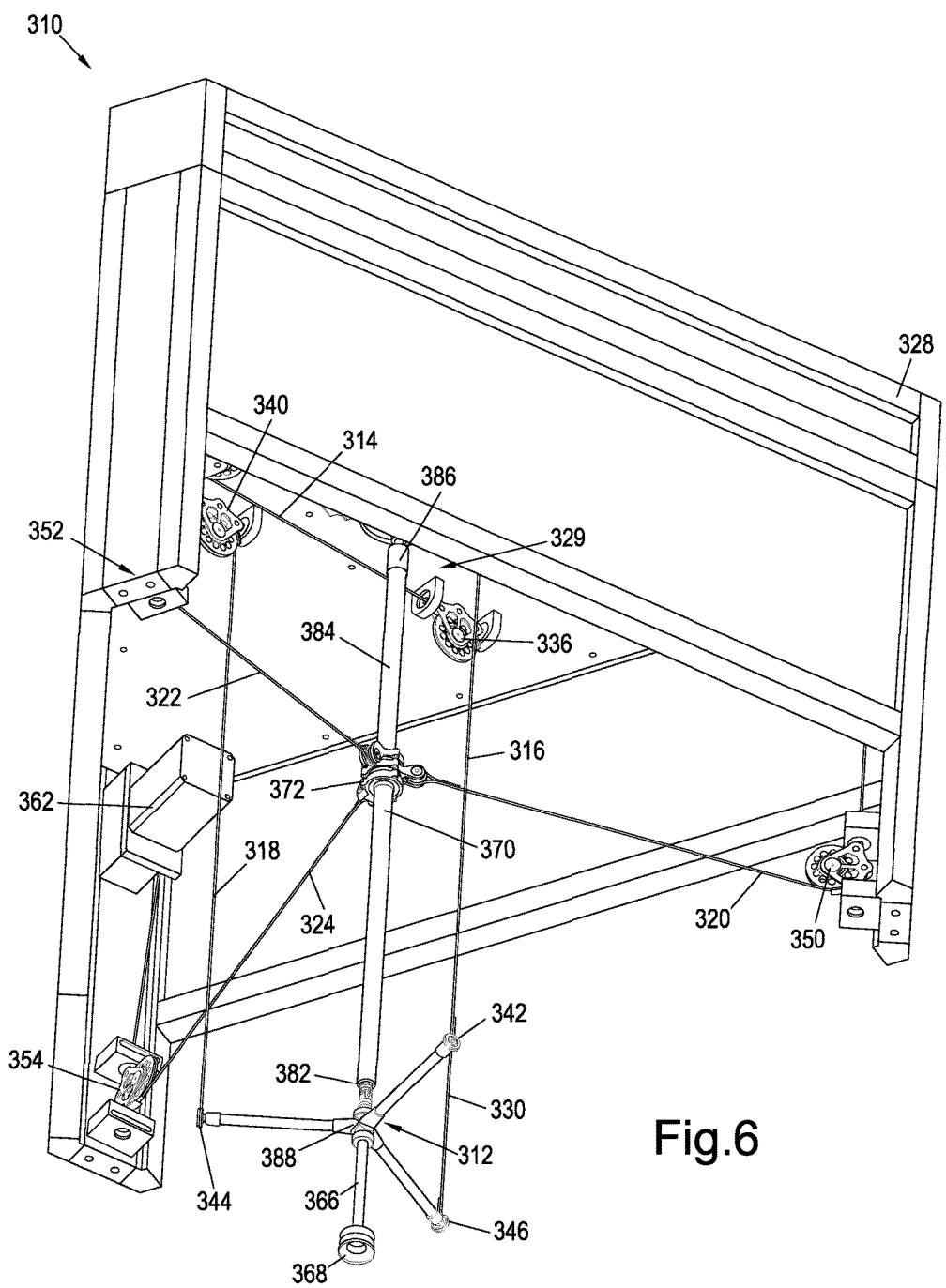
FIG. 6 shows a robotic apparatus for the movement and positioning of an element in accordance with an embodiment of the invention.
Figure 7:
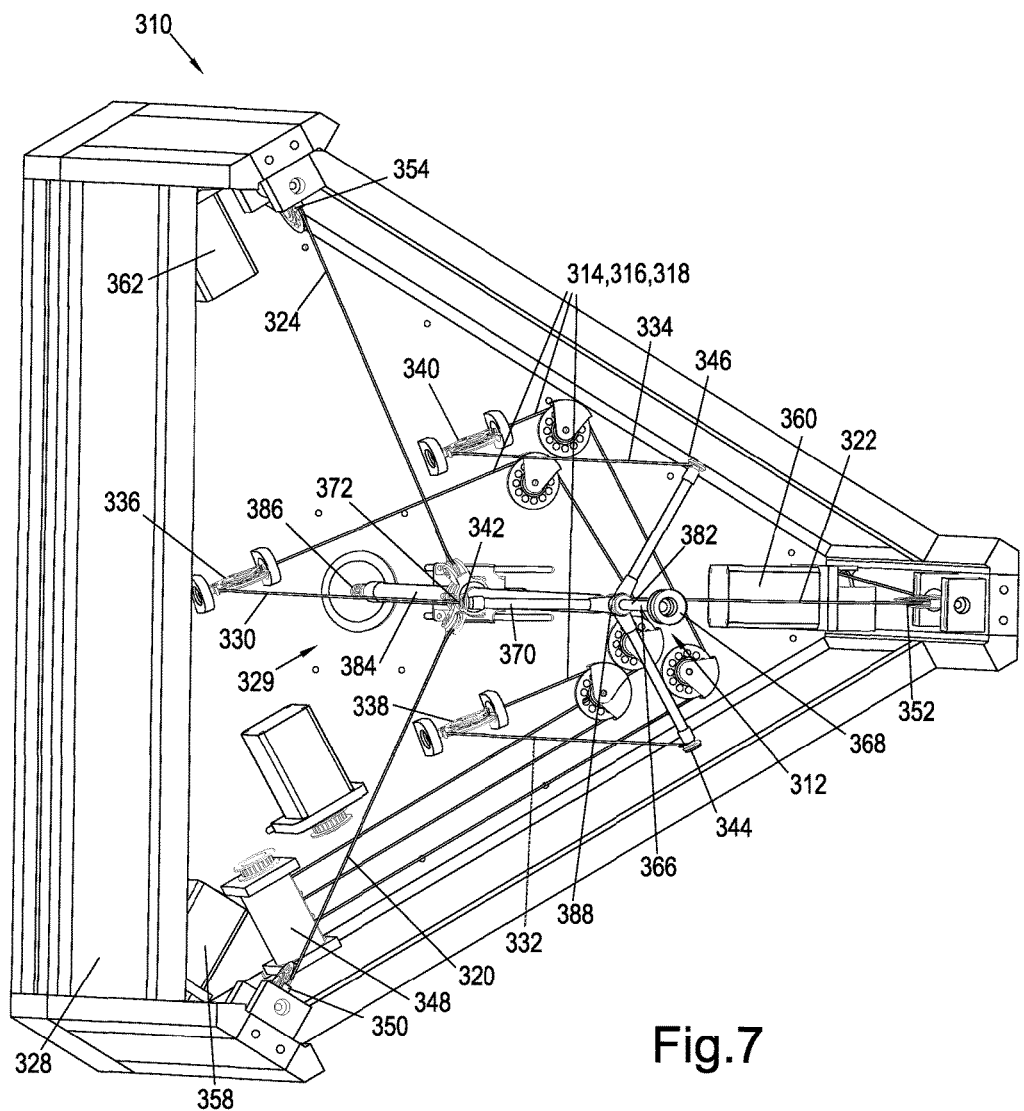
FIG. 7 is an alternative view of the apparatus of FIG. 6.
Figure 8:
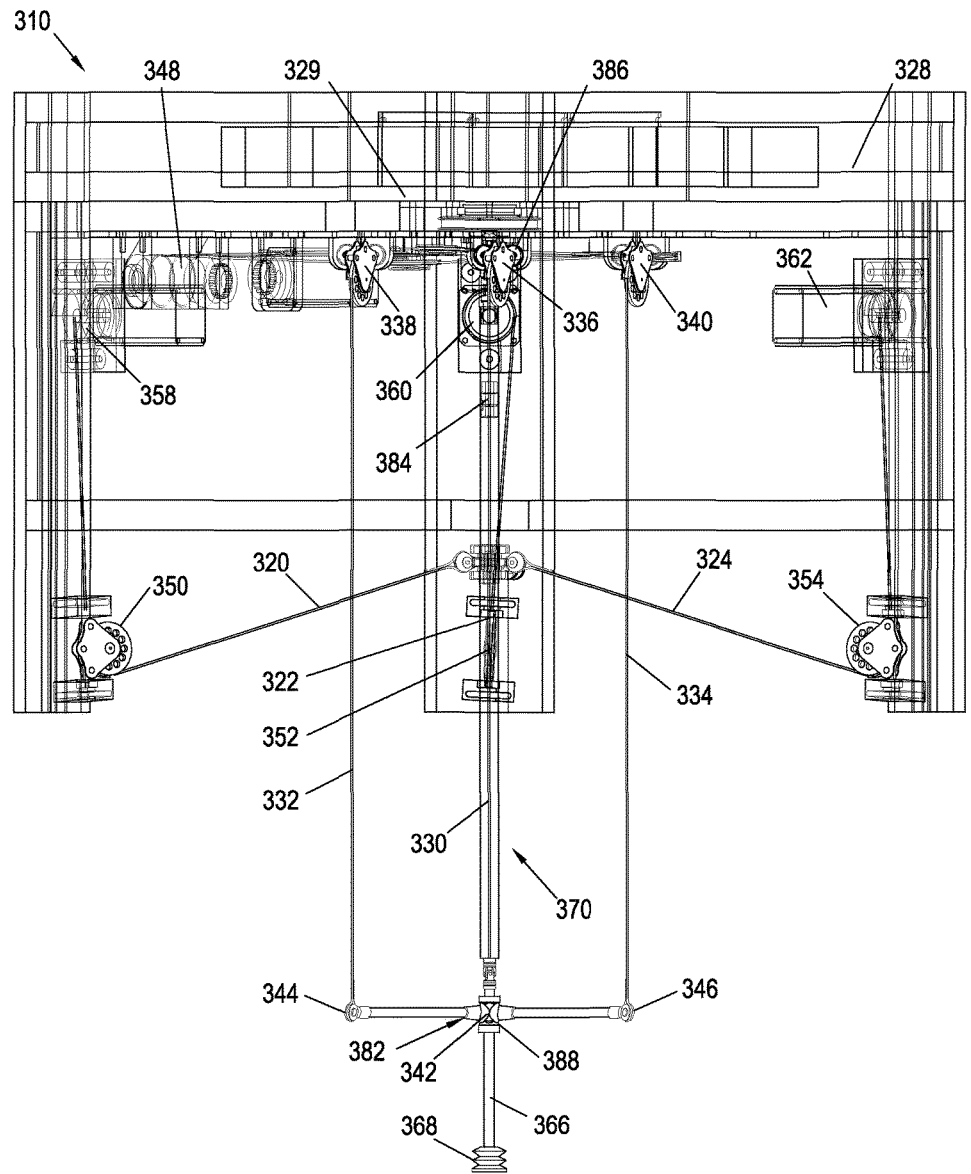
FIG. 8 is another alternative view of the apparatus of FIG. 6.

FIGS. 6, 7 and 8 are views of another embodiment of an apparatus 310 of the present invention. The apparatus shown in FIGS. 6, 7 and 8 is generally similar to that shown in FIG. 5, and as such like features share like reference numerals, incremented by 100. The apparatus 310 further comprises a central connection member 384 connecting a movable member 312 to a support structure 328 at a support member base 329. The support structure 328 is substantially rigid.

The central connection member 384 is pivotally connected to the support member base 329 at a connection member first portion 386. The central connection member 384 is pivotally connected to the movable member 312 at a connection member second portion 388. The central connection member 384 shown is a substantially rigid telescopic rod.

Three tensile positioning members 320, 322, 324 each pull the central connection member 384 in a different substantially radial direction from the other tensile positioning members 320, 322, 324. Accordingly, the central connection member 384 may be pulled in any substantially radial direction by adjusting the relative tensions in the positioning members 320, 322, 324. The three tensile positioning members 320, 322, 324 are connected to the movable member 312 via the connection member 384.

Each of three support members 314, 316, 318 is configured to exert an axially compressive force on the connection member 384, to pull the movable member 312 and the connection member 384 axially towards the support member base 329, and away from the moveable member 312. Each of the positioning members 320, 322, 324 is configured to exert an axially tensile force on the connection member 384, by pulling the connection member axially away from the support member base 329.

In operation, the moveable member 312 is lowered towards an element to be moved (not shown) by telescopically extending the connection member 384. A stalk 366 connecting a gripper 368 to a moveable member chassis 370 is thereby lowered. In the embodiment shown, the gripper 368 comprises a suction cup for attaching the movable member 312 to the element to be moved. Once lowered to an initial position for attachment to the element to be moved, the gripper 368 is activated to grip the element to be moved. Thereafter, the element to be moved can be raised by reversing the telescopic extension of the connection member 384 and/or swinging the movable member 312 laterally in an arc defined by the connection member 384. The movable member 312 is moved laterally by adjusting the relative lengths of the tensile positioning members 320, 322, 324. A control system monitors the displacement of each positioning member 320, 322, 324 and synchronously adjusts a respective positioning actuator 358, 360, 362 to control a lateral position of the movable member 312. The element to be moved is repositioned to a target location, where the element is typically lowered for detachment from the gripper 368, such as for release into a receiving element (e.g. a holder or a further assembly component). The movable member may impart a motion and/or a force to the element to be moved at the initial and/or target location/s: for example, the gripper 368 may rotate the element to be moved about an axis of the element to be moved such that the element may be attached to and/or detached from the receiving element (such as un/screwed from/to an assembly component). The inclination of the movable member 312 and thus the element to be moved is maintained throughout repositioning in this embodiment by maintaining the effective lengths and tensions of the support members 314, 216, 318. To this end, a common support actuator 348 to which the support members 314, 316, 318 are connected has a sensor to provide tension-controlled actuation.

As clearly visible in FIG. 8, the gripper 368 is separated from the movable member chassis 370 by the stalk 366 such that the element to be moved is remote from the support members 314, 316, 318, support member anchors, the positioning members 320, 322, 324 and the positioning member anchors 350, 352, 354 throughout movement. Accordingly, interference between the element to be moved and any tensile members 314, 316, 318, 320, 322, 324 is prevented.

FIGS. 9 to 23 schematically illustrate an operation of an apparatus 410 generally similar to that of FIGS. 6 to 8. The apparatus 410 shown in FIGS. 9 to 23 is generally similar to that shown in FIG. 6, and as such like features share like reference numerals, incremented by 100. The positioning members 420, 422, 424 of the apparatus 410 comprise pairs of tensile positioning elements 421a and 421b; 423a and 423b; 425a and 425b respectively.

Each tensile positioning element 421a, 421b; 423a, 423b; 425a, 425b of each pair is substantially parallel with the other tensile positioning element 421a, 421b; 423a, 423b; 425a, 425b of the pair. Each tensile positioning element 421a, 421b; 423a, 423b; 425a, 425b of each pair remains substantially parallel with the other tensile positioning element 421a, 421b; 423a, 423b; 425a, 425b of the pair throughout repositioning.

Each tensile positioning member 420, 422, 424 is configured to control an orientation of the movable member 412. Each pair of tensile positioning elements 421a, 421b; 423a, 423b; 425a, 425b defines a trapezoidal linkage with a support structure 428 and the movable member 412, in the form a parallelogram linkage. Accordingly the tensile positioning members 420, 422, 424 control the orientation of the movable member 412 with respect to the support structure 428.

Figure 9:
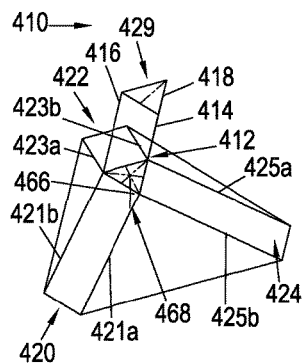
FIG. 9 shows a first isometric view of a schematic representation of a robotic apparatus for the movement and positioning of an element in accordance with an embodiment of the invention, with a movable member in a middle lateral position.
Figure 10:
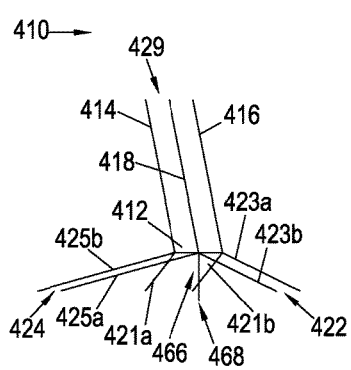
FIG. 10 shows a side view of the schematic representation of FIG. 9.
Figure 11:
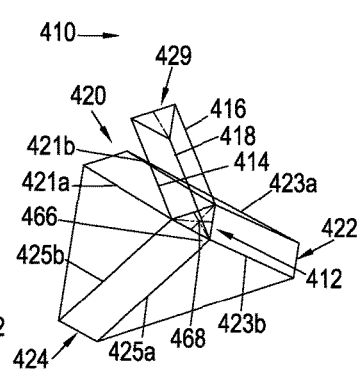
FIG. 11 shows a second isometric view of the schematic representation of FIG. 9.

FIGS. 9, 10 and 11 show three respective views of the apparatus 410 in a middle lateral position: FIG. 9 shows a first isometric view; FIG. 10 shows a side view and FIG. 11 shows a second isometric view. The movable member 412 is shown with the tensile positioning member 422 shortest, such that the movable member 412 is positioned towards an anchor point of the tensile positioning member 422 in the middle lateral position.

Figure 12:
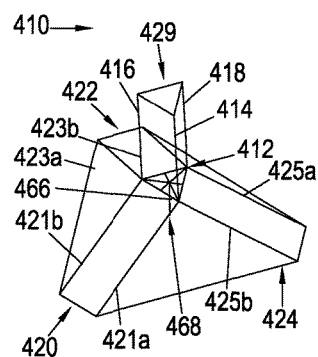
FIG. 12 shows a first isometric view of a schematic representation of the robotic apparatus of FIG. 9, with the movable member in a raised central position.
Figure 13:
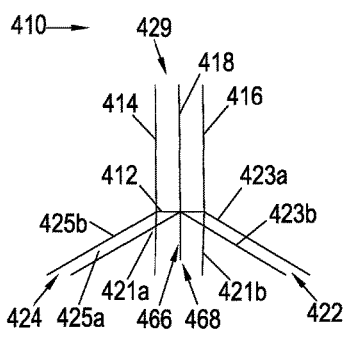
FIG. 13 shows a side view of the schematic representation of FIG. 12.
Figure 14:
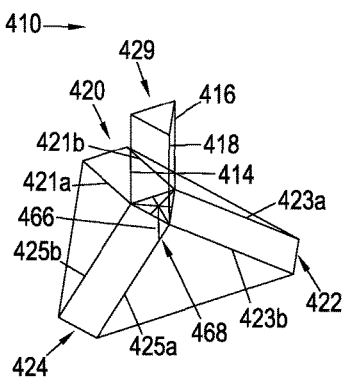
FIG. 14 shows a second isometric view of the schematic representation of FIG. 12.

FIGS. 12, 13 and 14 show three respective views of the apparatus 410 in a raised central position: FIG. 12 shows a first isometric view; FIG. 13 shows a side view and FIG. 14 shows a second isometric view. The movable member 412 is shown with the tensile positioning members 420, 422, 424, all substantially the same effective length such that the movable member 412 is positioned centrally beneath the support member base 429 in the raised central position. The effective lengths of the tensile support members 414, 416, 418 are substantially shorter than in the lowered lateral position.

Figure 15:
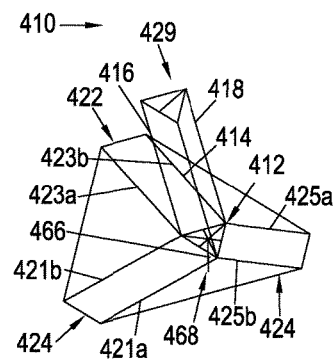
FIG. 15 shows a first isometric view of a schematic representation of the robotic apparatus of FIG. 9, with the movable member in a lowered lateral position.
Figure 16:
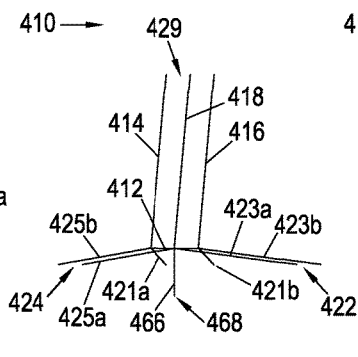
FIG. 16 shows a side view of the schematic representation of FIG. 15.
Figure 17:
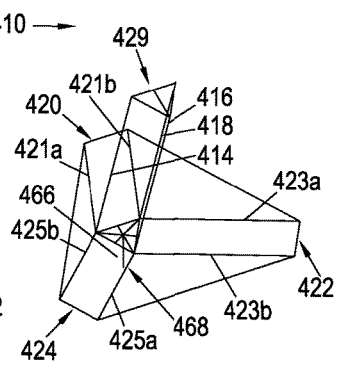
FIG. 17 shows a second isometric view of the schematic representation of FIG. 15.

FIGS. 15, 16 and 17 show three respective views of the apparatus 410 in a lowered lateral position: FIG. 15 shows a first isometric view; FIG. 16 shows a side view and FIG. 17 shows a second isometric view. The movable member 412 is shown with the tensile positioning members 420, 422, 424, all substantially the same effective length such that the movable member 412 is positioned centrally beneath the support member base 429 in the raised central position. The effective lengths of the tensile support members 414, 416, 418 are substantially shorter than in the lowered lateral position.

Figure 18:
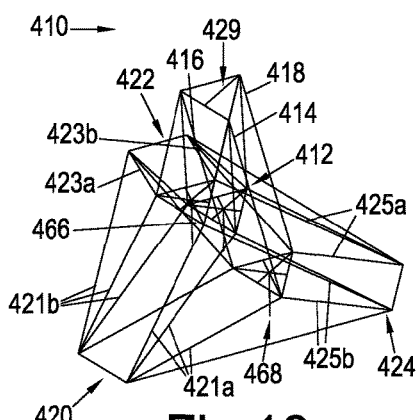
FIG. 18 shows a compilation of the first isometric views of the positions of FIGS. 9, 12 and 15.
Figure 19:
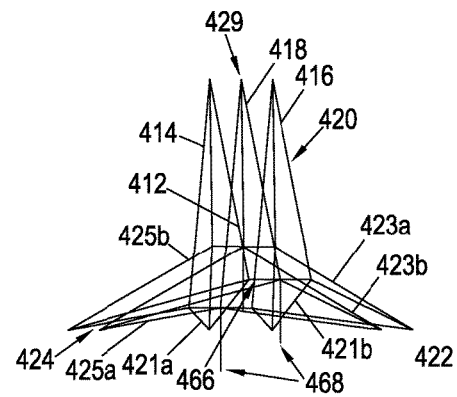
FIG. 19 shows a compilation of the side views of the positions of FIGS. 10, 13, and 16.
Figure 20:
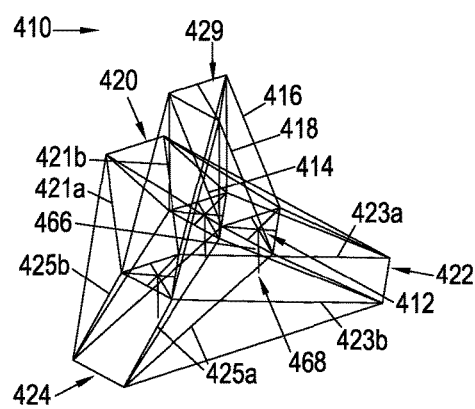
FIG. 20 shows a compilation of the second isometric views of the positions of FIGS. 11, 14 and 17.

FIGS. 18, 19 and 20 schematically show the position of FIGS. 9, 10 and 11 superimposed with the position of FIGS. 12, 13 and 14, and with the position of FIGS. 15, 16 and 17. Accordingly, FIG. 18 shows a compilation of the first isometric views of the positions of FIGS. 9, 12 and 15; FIG. 19 shows a compilation of the side views of the positions of FIGS. 10, 13, and 16; and FIG. 20 shows a compilation of the second isometric views of the positions of FIGS. 11, 14 and 17. Accordingly, the relative movement of the movable member 412 with a gripper 468 between the middle lateral position of FIG. 9 (leftmost position in FIG. 18 and rightmost position in FIGS. 19 and 20), the raised central position of FIG. 12 (also the central position in FIGS. 18, 19 and 20) and the lowered lateral position of FIG. 15 (rightmost position in FIG. 18 and leftmost position in FIGS. 19 and 20) is evident in FIGS. 18, 19 and 20. The exemplary positions indicate how the movable member 412 may be moved vertically and/or horizontally or along any vector path, such as linear or arcuate, within a working volume defined within anchor points of the tensile positioning members 420, 422, 424, below the tensile support members 414, 416, 418.

Figure 21:
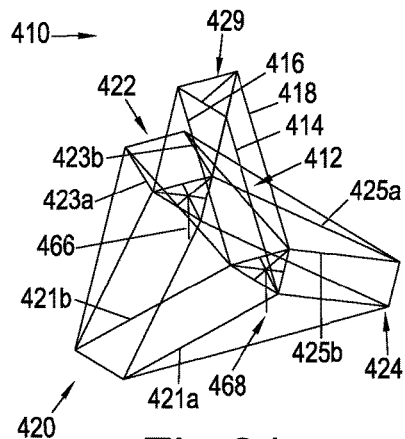
FIG. 21 shows a compilation of the first isometric views of the positions of FIGS. 9 and 15.
Figure 22:
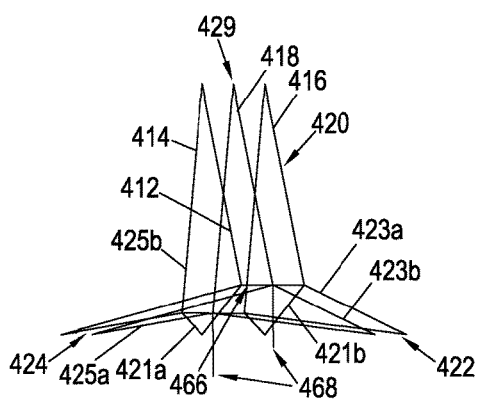
FIG. 22 shows a compilation of the side views of the positions of FIGS. 10 and 16.
Figure 23:
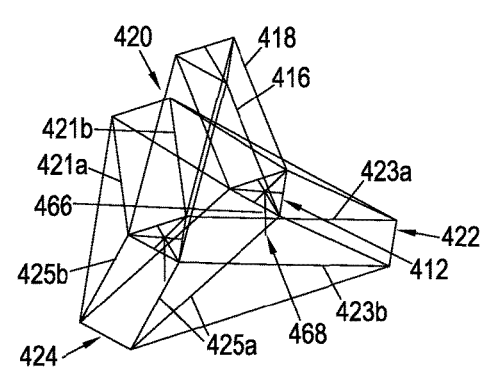
FIG. 23 shows a compilation of the second isometric views of the positions of FIGS. 11 and 17.

FIGS. 21, 22 and 23 are similar to FIGS. 18, 19 and 20 respectively, with the side views of the positions of FIGS. 10, 13, and 16 removed. Accordingly, FIGS. 21, 22 and 23 show two positions of the movable member 412, exemplifying a range of movement of the movable member 412. Although, it will be appreciated that a movement of the movable member 412 between the two exemplary positions may follow any path: albeit a substantially linear path may be the most desirable.

Figure 24:
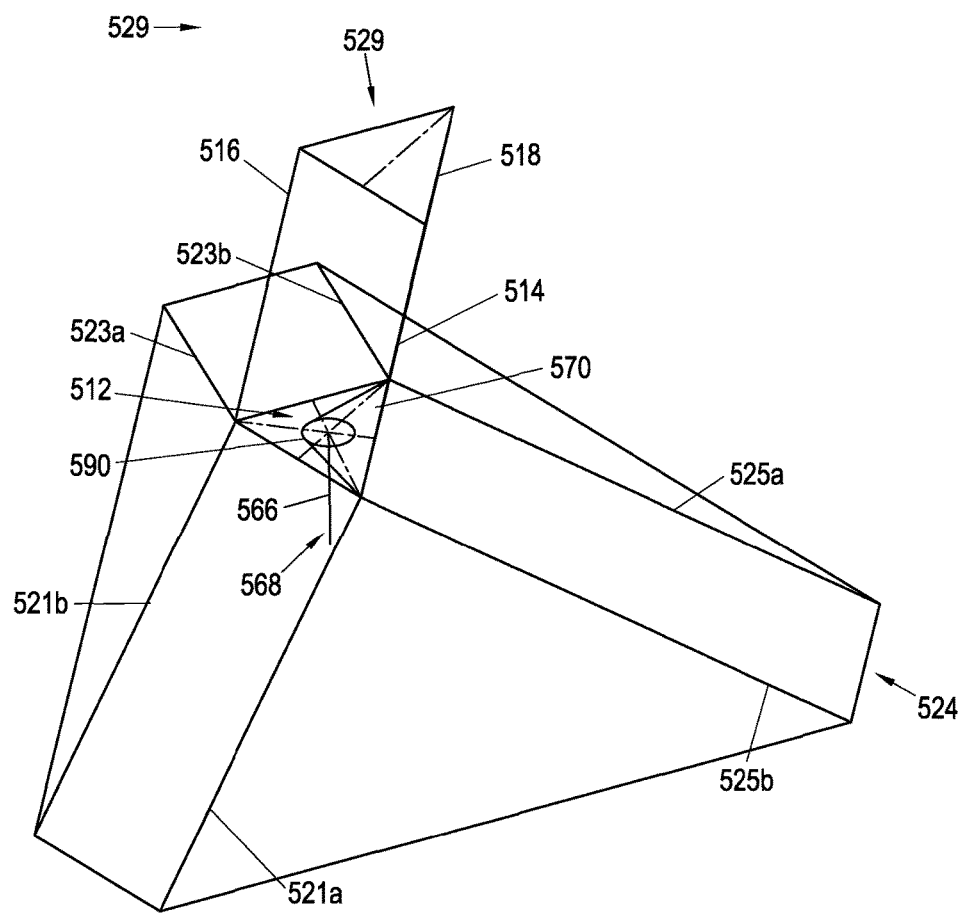
FIG. 24 schematically shows a robotic apparatus for the movement and positioning of an element in accordance with an embodiment of the invention, with a rotation actuator.
Figure 25:
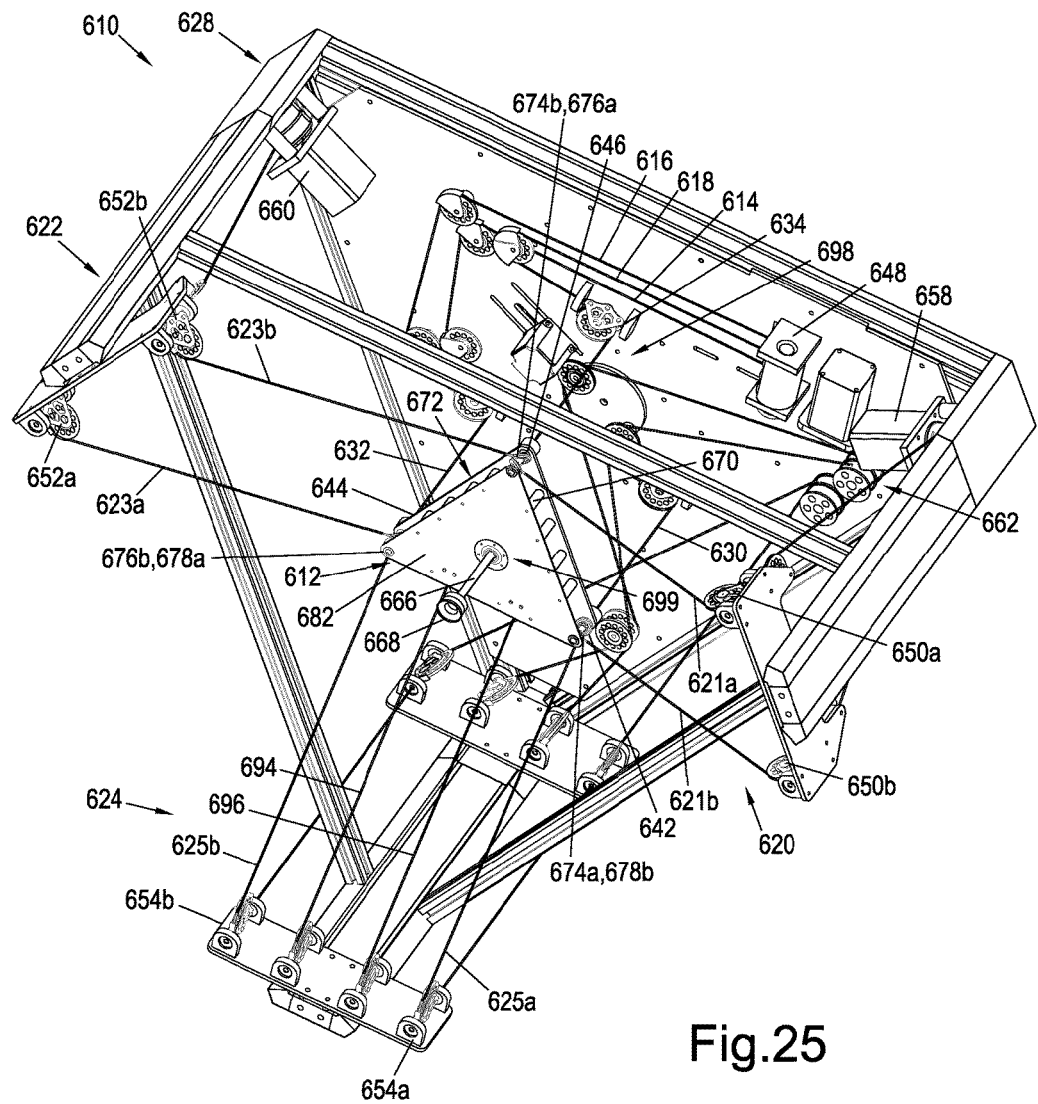
FIG. 25 shows a robotic apparatus for the movement and positioning of an element in accordance with an embodiment of the invention, with a rotation actuator.
Figure 26:
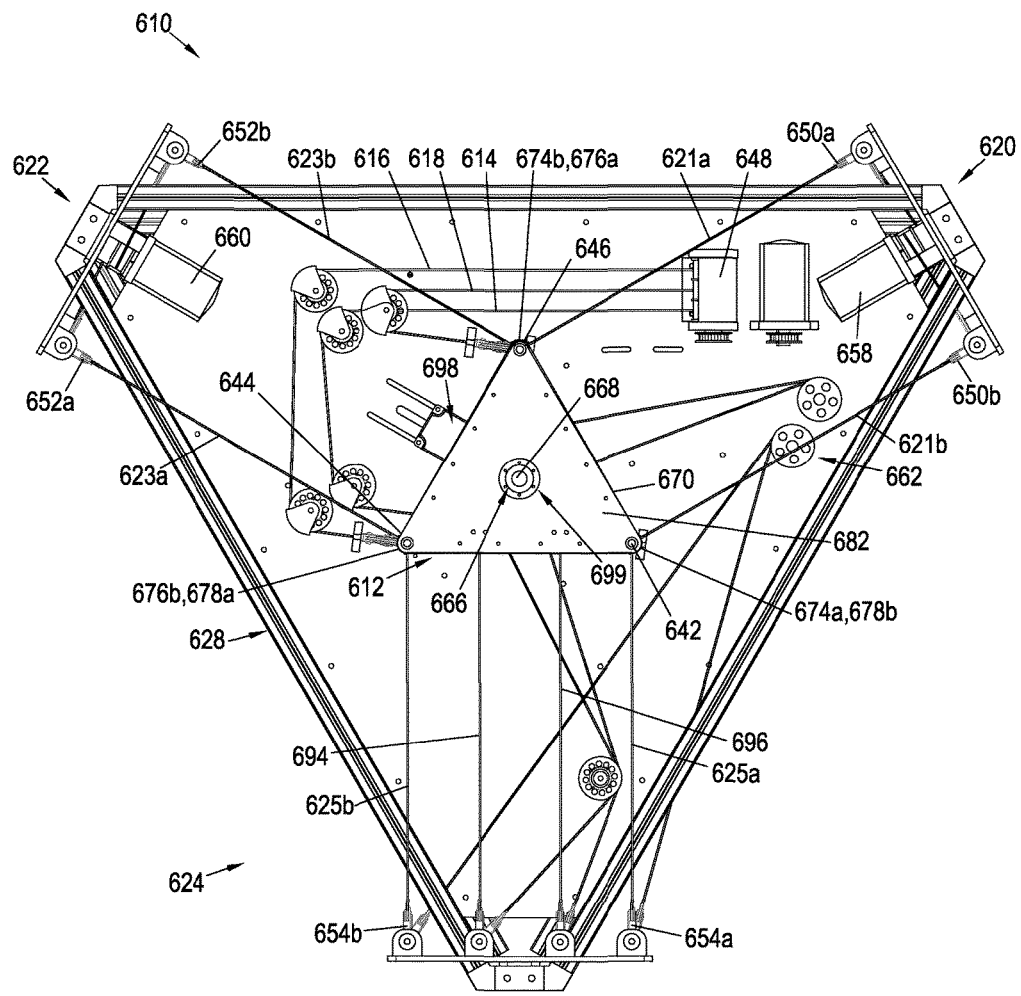
FIG. 26 shows a bottom view of the apparatus of FIG. 25.
Figure 27:
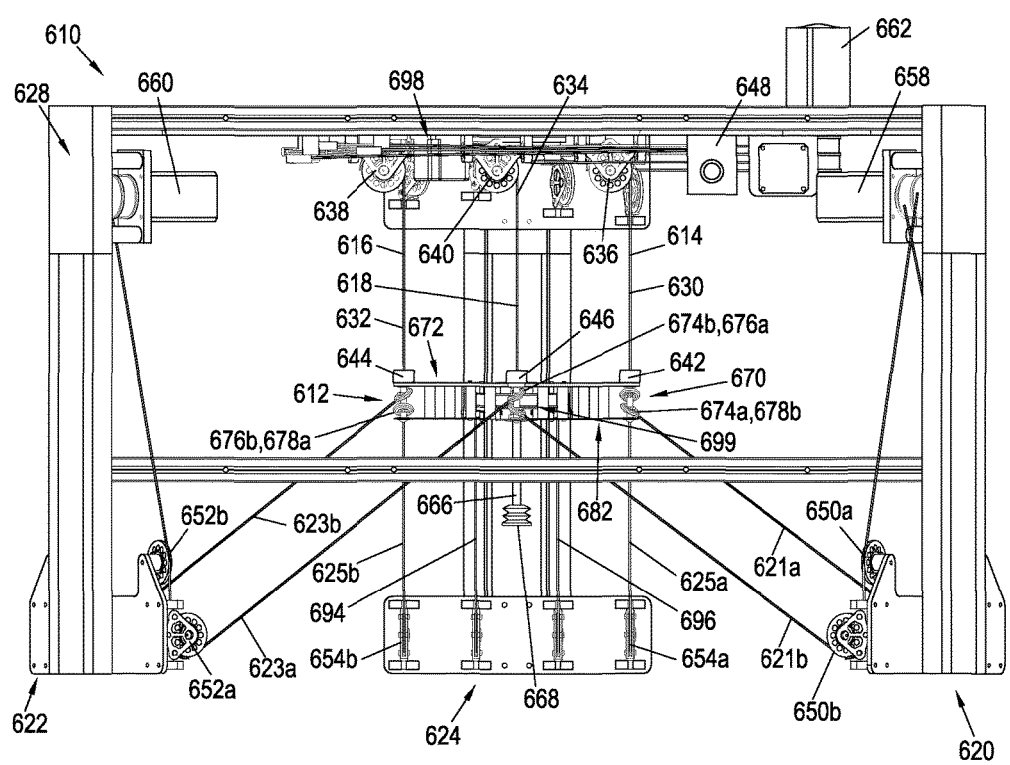
FIG. 27 shows a side view of the apparatus of FIG. 25.
Figure 28:
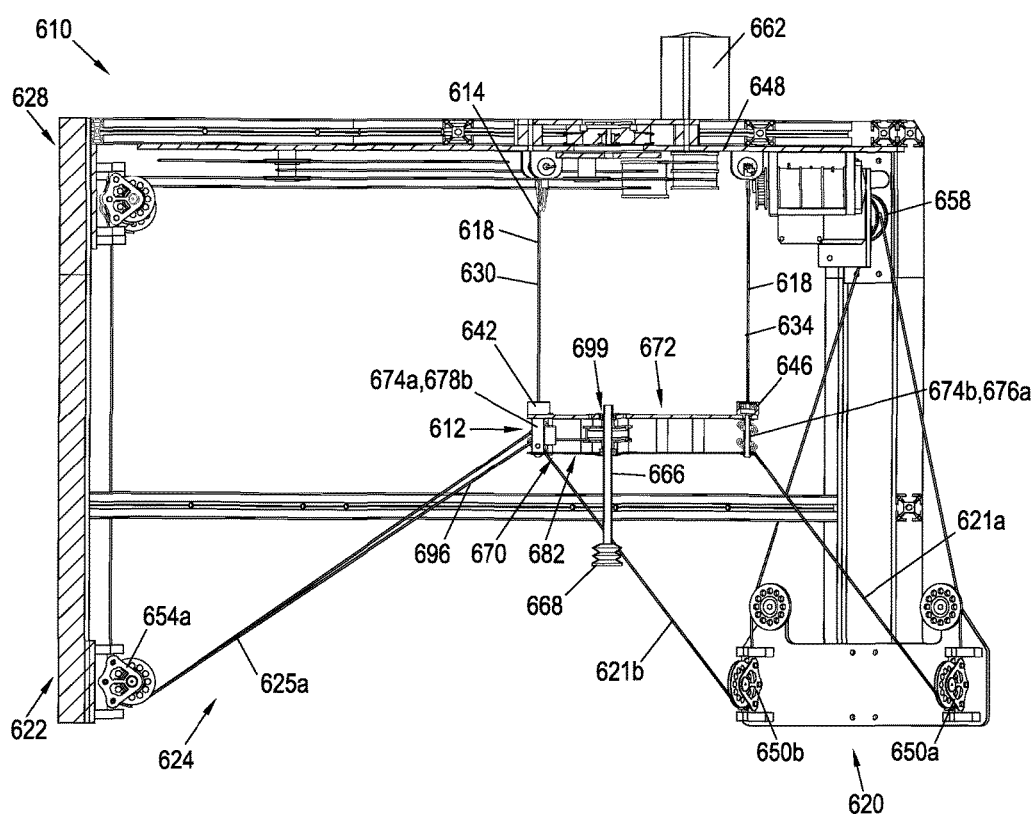
FIG. 28 shows a cross-sectional view of the apparatus of FIG. 25.
Figure 29:
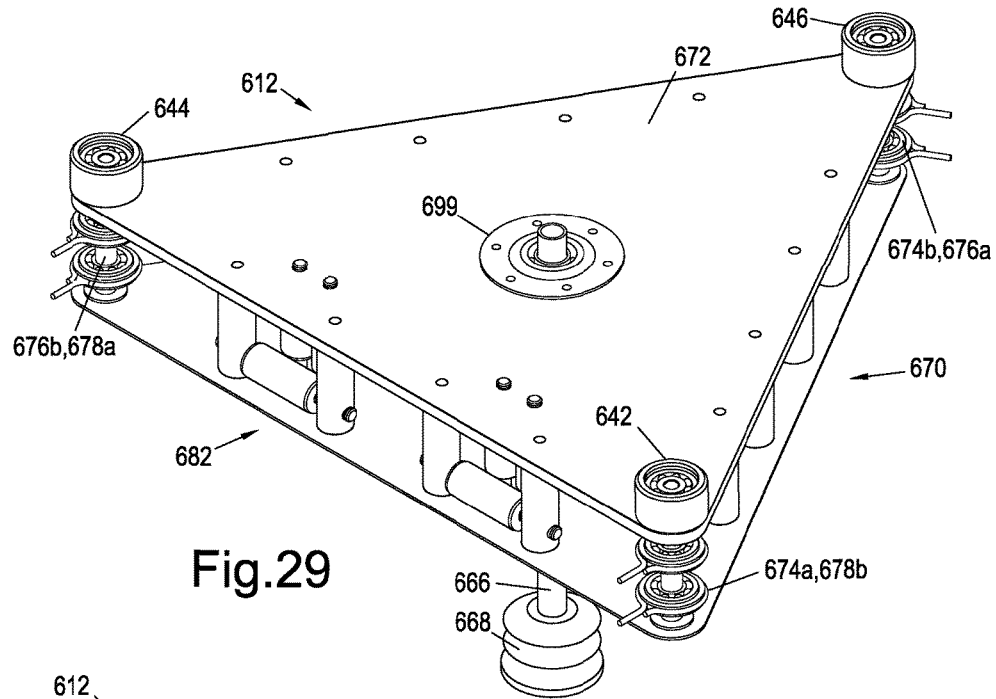
FIG. 29 shows a detail view of the movable member of the apparatus of FIG. 25.
Figure 30:
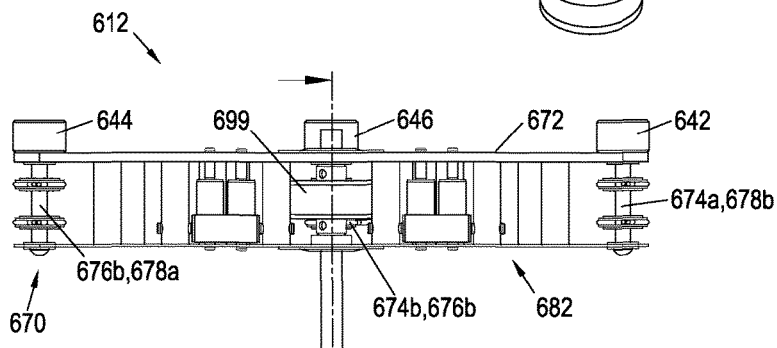
FIG. 30 shows a side view of the movable member of FIG. 29.
Figure 31:
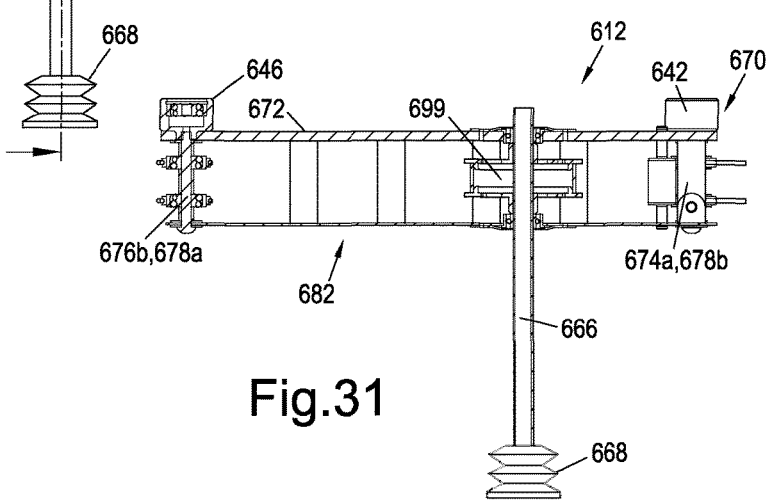
FIG. 31 shows a cross-sectional view of the movable member of FIG. 30.
Figure 32:
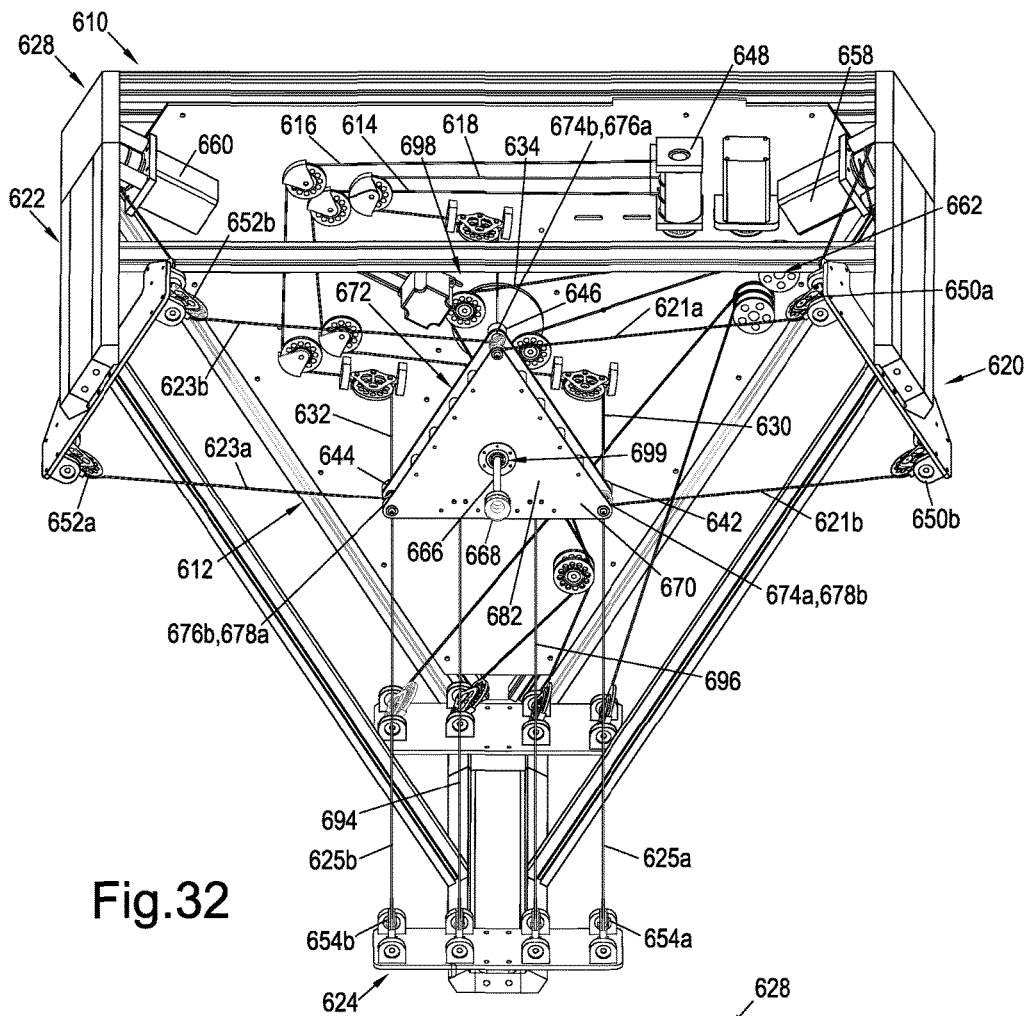
FIG. 32 shows a bottom perspective view of the apparatus of FIG. 25.
Figure 33:
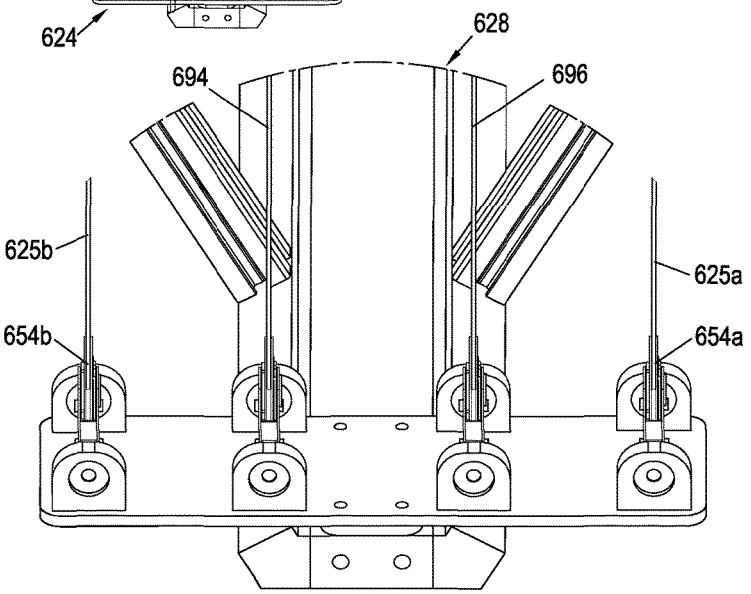
FIG. 33 shows a detail view of a portion of the apparatus of FIG. 32.

FIG. 24 schematically shows an apparatus 510 similar to that of FIG. 9, with an attachment interface orientation means 590. The apparatus 510 shown in FIG. 24 is generally similar to that shown in FIG. 23, and as such like features share like reference numerals, incremented by 100. The attachment interface orientation means 590 is operable to rotate a gripper 568 relative to a movable member chassis 570. The attachment interface orientation means 590 shown comprises a pulley and is actuable via a positioning member 524, in the embodiment shown (forming a loop with a pair of positioning elements separated by the pulley).

Reference is now made to FIGS. 25 to 35, which show an apparatus 610 in accordance with another embodiment of the invention. The apparatus 610 shown in FIGS. 25 to 35 is generally similar to that shown in FIG. 24, and as such like features share like reference numerals, incremented by 100. The attachment interface orientation means 690 is operable to rotate the gripper 668 relative to the movable member chassis 670. In the embodiment shown, the attachment interface orientation means 690 is actuable via an orientation member 692. The orientation member 692 shown comprises a tensile member comprising a loop with a pair of tensile elements 694, 696; discrete from the positioning members 620, 622, 624 (with respective pairs of tensile positioning elements 621a and 621b; 623a and 623b; 625a and 625b).

The orientation member 692 is connected to an orientation actuator 698. The orientation actuator 698 controls the orientation of the stalk 666 connecting the gripper 668 to the moveable member chassis 670. Variation in relative tension between the tensile elements 694, 696 is transmitted via an orientation pulley 699 to the stalk to vary the orientation of the stalk 666 relative to the chassis 670 (whose orientation remains substantially constant throughout repositioning). Accordingly elements to be moved, such as production components can be rotated before and/or during and/or after repositioning (e.g. to screw/unscrew and/or orientate relative to another production component).

Each tensile positioning member 620, 622, 624 is configured to control an orientation of the movable member 612. Each tensile positioning element 621a and 621b; 623a and 623b; 625a and 625b of each pair is substantially parallel with the other tensile positioning element of the pair 621a and 621b; 623a and 623b; 625a and 625b. Each tensile positioning element of each pair 621a and 621b; 623a and 623b; 625a and 625b remains substantially parallel with the other tensile positioning element 621a and 621b; 623a and 623b; 625a and 625b of the pair throughout the movement of the movable member 612 (e.g. repositioning). Accordingly, the tensile positioning members 620, 622, 624 are configured to maintain the orientation of the movable member 612.

Each tensile positioning element 621a and 621b; 623a and 623b; 625a and 625b of the pair has a substantially similar effective length as the other element 621a and 621b; 623a and 623b; 625a and 625b of the pair. Each tensile positioning element 621a and 621b; 623a and 623b; 625a and 625b of each pair maintains a substantially similar effective length as the other element 621a and 621b; 623a and 623b; 625a and 625b of the pair during movement of the movable member 612 (e.g. repositioning). Each pair of tensile positioning elements 621a and 621b; 623a and 623b; 625a and 625b defines a trapezoidal linkage with the support structure 628 and the movable member 612, in the form a parallelogram linkage. Accordingly the tensile positioning members 620, 622, 624 control the orientation of the movable member 612 with respect to the support structure 628. The tensile positioning members 620, 622, 624 are configured to maintain an orientation of the movable member 612, such as maintaining the rotational orientation of the movable member 612 relative to the positioning plane (e.g. yaw).

Each tensile positioning element 621a and 621b; 623a and 623b; 625a and 625b of each pair is controlled by a respective common positioning actuator 658, 660, 662, 664.

Each positioning actuator 658, 660, 662, 664 is independently actuable such that each positioning actuator 658, 660, 662, 664 may exert a different force on each respective positioning member 620, 622, 624, 626 (with respective pairs of tensile positioning elements 621a and 621b; 623a and 623b; 625a and 625b).

The positioning members 620, 622, 624 are distributed around the moveable member 612 such that the moveable member 612 is pulled in multiple directions. Accordingly, the moveable member 612 is movable in any lateral direction at any time by the positioning members 620, 622, 624 when a resultant force of their respective tensions is imbalanced.

The movable member 612 is moved laterally by adjusting the relative lengths of the tensile positioning members 620, 622, 624. A control system monitors the displacement of each positioning member 620, 622, 624 and synchronously adjusts the respective positioning actuators 658, 660, 662 to control a lateral position of the movable member 612. Actuation of each positioning actuator 658, 660, 662 varies similarly the effective length of each of the associated elements of the pair 621a and 621b; 623a and 623b; 625a and 625b. Accordingly, the tensile positioning members 620, 622, 624 (with respective pairs of tensile positioning elements 621a and 621b; 623a and 623b; 625a and 625b) are configured to prevent rotation of the movable member 612, such as rotation of the movable member 612 about a central axis, such as an axis defined centrally between the support members 614, 616, 618 in the neutral position (e.g. vertical—or perpendicular to the positioning plane, passing through the centre of the movable member 612).

It should be understood that the embodiments described herein are merely exemplary and that various modifications may be made thereto without departing from the scope of the invention. For example, although shown here with fixed lengths, in alternative embodiments the movable member support members may comprise variable lengths. For example, the apparatus may be configured to vary the respective lengths of the support members to correspondingly vary an inclination of the movable member. The support member lengths may be synchronously varied similarly to the tensile members. The variation in length of the support members and the variation in length of the tensile members may be synchronised such that the inclination and position of the movable member may be synchronised.

Although shown here in vertical orientations most suitable for lifting operations, it will be appreciated that the present invention is suitable for use in other orientations. For example, in alternative embodiments, the apparatus may be inverted or partially inverted, such as for use in non-lifting processes (e.g. applying paint to a wall).

The applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. A robotic positioning apparatus configured for moving an element from an initial position to a target position, the apparatus comprising:
   a moveable member suspended from a support structure, wherein the moveable member is attachable to the element to be moved;
   at least three substantially parallel tensile support members for supporting the movable member, wherein the tensile support members are each suspended from the support structure in a substantially parallel arrangement and each tensile support member connects to the moveable member such that substantially parallel disposition of the tensile support members is maintained;
   at least one tensile positioning member for repositioning the moveable member and for maintaining the tensile support members in tension by providing a tensile force on the moveable member balancing a tensile force on the moveable member provided by the tensile support members; and
   a support actuator;
   wherein the at least three substantially parallel tensile support members are each connected at one end to the support actuator such that a substantially equal effective length of each tensile support member is maintained and such that an inclination of at least a portion of the moveable member is maintained during repositioning.

2. The apparatus of claim 1, wherein the at least one tensile positioning member comprises a pair of tensile positioning elements.

3. The apparatus of claim 2, wherein each tensile positioning element of the pair is substantially parallel with the other tensile positioning element of the pair.

4. The apparatus of claim 1, wherein, the support structure comprises one or more of a support member base and a positioning member frame.

5. The apparatus of claim 4, wherein the at least one tensile positioning member is configured to pull the movable member away from the support member base.

6. The apparatus of claim 4, wherein the apparatus is configured to control a separation of the movable member from the support member base by controlling a relative pull on the movable member by the respective support members and positioning members.

7. The apparatus of claim 4, wherein the apparatus comprises a central connection member connecting the movable member to the support structure.

8. The apparatus of claim 7, wherein the central connection member is pivotally connected to the support member base at a connection member first portion.

9. The apparatus of claim 7, wherein the support members are configured to exert an axially compressive force on the connection member.

10. The apparatus of claim 7, wherein the connection member is extensible.

11. The apparatus of claim 7, wherein the connection member is configured to selectively comprise a fixed length.

12. The apparatus of claim 1, wherein each tensile support member is configured to maintain the inclination of the movable member.

13. The apparatus of claim 1, wherein each tensile support member is configured to control an orientation of the movable member.

14. The apparatus of claim 1, wherein the at least one tensile positioning member is configured to maintain each tensile support member in tension.

15. The apparatus of claim 1, wherein the at least one tensile positioning member is configured to control an orientation of the movable member.

16. The apparatus of claim 1, wherein the movable member is movable by adjusting relative effective lengths of the at least one tensile positioning member.

17. The apparatus of claim 1, wherein the at least one tensile positioning member comprises a flexible tensile element.

18. The apparatus of claim 1, wherein each tensile support member is configured to exert a first net tensile force on the movable member in a first direction, and the at least one tensile positioning member is configured to exert a second net tensile force on the movable member in a second direction.

19. The apparatus of claim 1, wherein a plurality of tensile positioning members are distributed around the movable member.

20. The apparatus of claim 19, wherein the apparatus is configured to synchronously adjust relative lengths of the positioning members.

21. The apparatus of claim 1, wherein the apparatus is configured to synchronously adjust lengths of the at least three tensile support members.

22. The apparatus of claim 1, wherein the apparatus is configured to control the position and movement of the movable member using one or more of position-dependent control, displacement-dependent control, force-dependent control.

23. The apparatus of claim 1, wherein tension in each tensile support member is displacement-controlled or tension-controlled, or both displacement controlled and tension controlled.

24. The apparatus of claim 1, wherein the apparatus comprises a positioning actuator, a length of the at least one tensile positioning member being controlled by the positioning actuator.

25. The apparatus of claim 24, wherein the apparatus comprises a control system for controlling the movement of the movable member, the control system sending a respective signal to each actuator to adjust the respective effective length of the at least one positioning member, or each support member, or both of the at least one positioning member and each support member.

26. The apparatus of claim 1, wherein the apparatus is configured to attach to and detach from the element to be moved.

27. The apparatus of claim 26, wherein the apparatus is configured to attach to and detach from the element to be moved outside a volume substantially circumscribed by the support structure.

28. The apparatus of claim 1, wherein the moveable member comprises a moveable member chassis, the chassis comprising a portion of the moveable member of maintained inclination during repositioning.

29. The apparatus of claim 28, wherein the moveable member comprises:
an attachment interface for attaching the movable member to the element to be moved; and
an attachment separation between the movable member chassis and the attachment interface.

30. The apparatus of claim 1, wherein the apparatus is configured to be calibrated.

31. The apparatus of claim 1, wherein the inclination is parallel to a base of the apparatus.

32. A method of robotically moving a movable member, the method comprising:
supporting the movable member from at least three substantially parallel tensile support members suspended from a support structure;
moving the movable member with at least one tensile positioning member;
maintaining the at least three tensile support members in tension with the at least one tensile positioning member by providing a tensile force on the moveable member balancing a tensile force on the moveable member provided by the tensile support members; and
maintaining an inclination of the moveable member with the tensile support members during movement of the moveable member, wherein each of the at least three tensile support members are connected to a common support actuator, wherein maintaining the inclination of the moveable member is by simultaneous control of each tensile support member by the support actuator to maintain a substantially equal effective length of each tensile support member.

33. The method of claim 32, wherein the method further comprises: attaching the movable member to an element to be moved.

34. The method of claim 32, wherein the method further comprises controlling an orientation of the movable member relative to the support structure.

35. The method of claim 34, wherein adjusting lengths of the tensile positioning members causes a connection member to pivot relative to the support structure comprising a support member base, wherein the support member base is pivotally connected to the connection member at a connection member second portion, such that the movable member moves.

36. The method of claim 32, wherein the at least one tensile positioning member comprises at least two tensile positioning members, and wherein the method further comprises:
adjusting relative lengths of the at least two tensile positioning members, wherein the at least two tensile positioning members are connected to the moveable member, and wherein the at least two tensile positioning members are configured to pull the moveable member in a different direction from the other tensile positioning member.

37. The method of claim 32, wherein the at least one tensile positioning member comprises at least three tensile positioning members, and wherein the method further comprises:
adjusting relative lengths of the at least three tensile positioning members, wherein the at least three tensile positioning members are connected to the moveable member, and the at least three tensile positioning members are configured to pull the moveable member in a different substantially radial direction from the other tensile positioning members.

* * * * *